(12) United States Patent
Inoue

(10) Patent No.: US 11,579,828 B2
(45) Date of Patent: Feb. 14, 2023

(54) IMAGE PROCESSING APPARATUS, METHOD OF PROVIDING CLOUD PRINT SERVICE, AND PROGRAM STORAGE MEDIUM

(71) Applicant: CANON KABUSHIKI KAISHA, Tokyo (JP)

(72) Inventor: Go Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/499,987

(22) Filed: Oct. 13, 2021

(65) Prior Publication Data
US 2022/0156017 A1    May 19, 2022

(30) Foreign Application Priority Data

Nov. 19, 2020   (JP) .............................. JP2020-192506

(51) Int. Cl.
*G06F 3/12*      (2006.01)
(52) U.S. Cl.
CPC ............ *G06F 3/126* (2013.01); *G06F 3/1204* (2013.01); *G06F 3/1238* (2013.01); *G06F 3/1287* (2013.01); *G06F 3/1289* (2013.01)
(58) Field of Classification Search
CPC ...... G06F 3/126; G06F 3/1204; G06F 3/1238; G06F 3/1287; G06F 3/1289
USPC ....................................................... 358/1.15
See application file for complete search history.

(56) References Cited

U.S. PATENT DOCUMENTS

| 8,675,234 B2 | 3/2014 | Sato | |
| 2015/0015908 A1* | 1/2015 | Tanaka | G06K 15/4095 358/1.14 |
| 2020/0133591 A1* | 4/2020 | Kaneda | G06F 3/122 |
| 2020/0233619 A1 | 7/2020 | Hosoda | |

FOREIGN PATENT DOCUMENTS

| EP | 3521998 A1 | 8/2019 |
| JP | 2012133489 A | 7/2012 |

OTHER PUBLICATIONS

Extended European search report issued in European Appln. No. 21202901.1 dated Apr. 7, 2022.

* cited by examiner

*Primary Examiner* — Allen H Nguyen
(74) *Attorney, Agent, or Firm* — Rossi, Kimms & McDowell LLP

(57) ABSTRACT

A printing apparatus registers the printing apparatus in a cloud print service, and generates a printer queue storing a print job to be transmitted to the printing apparatus on the cloud print service. If the printing apparatus is associated with a virtual printer on the cloud print service, the printing apparatus acquires information of print jobs managed by the virtual printer from the cloud print service. If an operation for printing the print jobs managed by the virtual printer is received, the printing apparatus gives an instruction for moving a print job that is specified on the basis of at least the acquired information of the print jobs to the printer queue for the printing apparatus provided on the cloud print service, and acquires the moved print job.

13 Claims, 27 Drawing Sheets

Printer list managed by cloud print service

■Virtual printer
| Name | Sharing | UUID |
|---|---|---|
| ・Virtual printer 501 | ON | 501-xxx |
| ・Virtual printer 502 | ON | 502-yyy |

■Printer
| | Sharing | UUID |
|---|---|---|
| ・Printing apparatus 101 | OFF | 101-aaa |
| ・Printing apparatus 102 | OFF | 102-bbb |
| ・Printing apparatus 108 | OFF | 108-ccc |
| ・Printing apparatus 109 | OFF | 109-ddd |

■Association between virtual printer and printer
・Virtual printer 501
  Associated printer    Printing apparatus 101
                              Printing apparatus 102
                              Printing apparatus 108
                              Printing apparatus 109
・Associated printer502
  Associated printer    Printing apparatus 101
                              Printing apparatus 109

```
Job list acquisition request packet during login

Operation : Get-Jobs Request
Attribute:
  which-jobs = fetchable
  my-jobs = true
  requesting-user-name = Alice
  requesting-user-uri = alice@ddd.cloud.com
```

```
Job list acquisition response packet during login

Operation : Get-Jobs Response
Status code : successful-ok
Attribute:
  job-id = 1
  job-id = 2
```

```
Job movement request packet

Operation : Move-Job Request
Attribute:
  job-id = 1,2
  forward-device-uuid = 501-xxxx
```

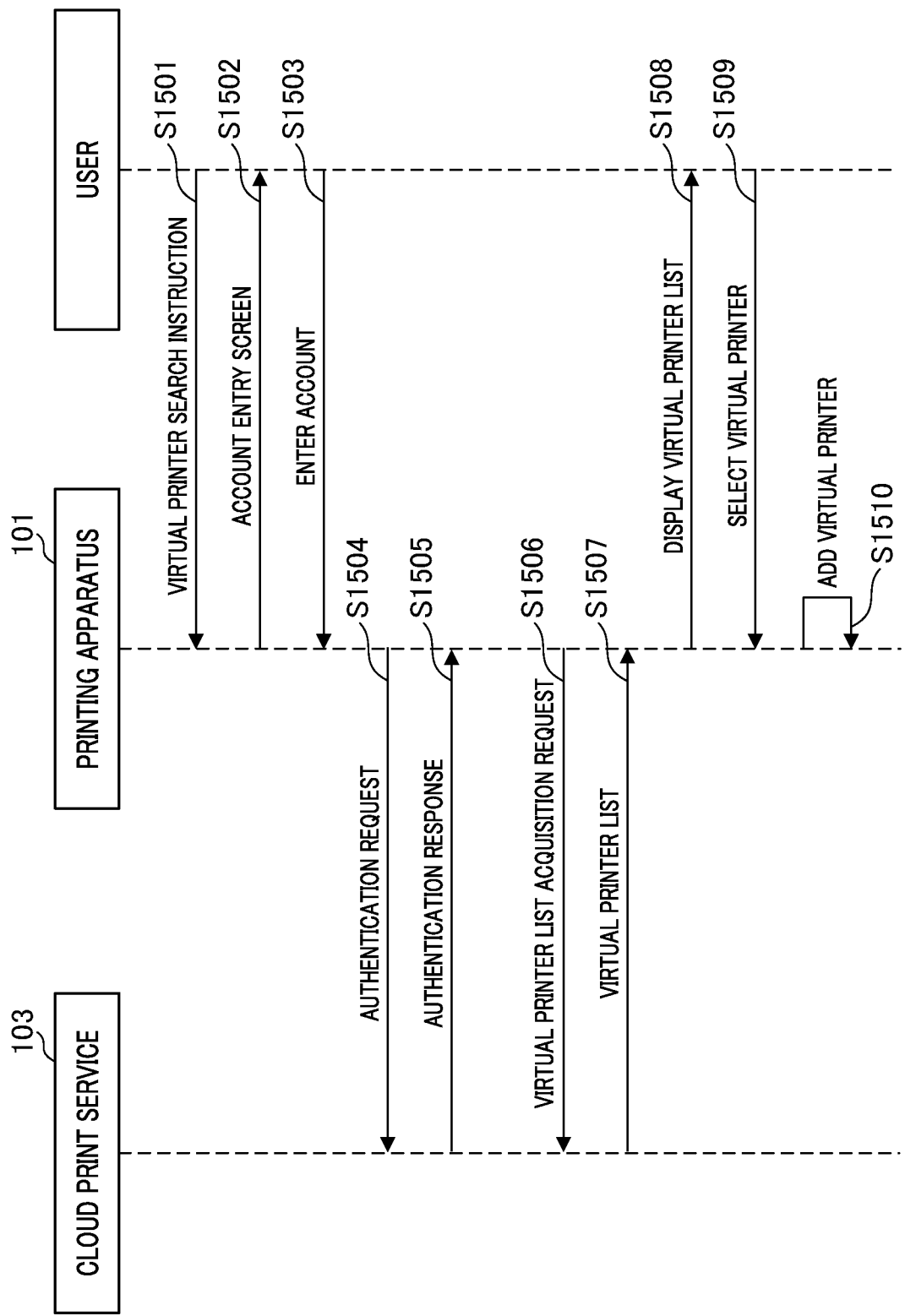

FIG. 21A

Cloud print service management screen — 1704

Registered virtual printer list

| No | Name | UUID |
|----|------|------|
| 1 | Virtual printer 501 | 501–xxx |

[Back]  [Edit]  [Create]

FIG. 21B

Cloud print service management screen — 1705

New virtual printer creation

- Virtual printer name: [Virtual printer 502]
- Virtual printer UUID: [Automatic generation] [Manual] [502–yyy]
- Virtual printer configuration: ▲
- Printer association: ▲

[Back]  [Creation completed]

FIG. 21C

Cloud print service management screen — 1706

Virtual printer configuration setting

- Color mode: ☑ Color support
- Number of sheets: [1 ~ 999]
- Number – UP: [1,2,4,8,16]
- Double-sided: ☑ Double-sided printing support
- Finishing: ☑ Staple
  ☑ Punch
  ☐ Fold

[Back]  [Complete]

(A) Virtual printer association notification packet

Operation : Get-Notification Response
Status Code : successful-ok
Attribute:
  notify-subscribe-id = 1
  notify-sequence-number = 1
  notify-subscribe-event = virtual-printer-related
  device-uuid = 501-xxx
  device-name = "virtual printer 501"
  access-token = ab12-2ed2-3333

IMAGE PROCESSING APPARATUS, METHOD OF PROVIDING CLOUD PRINT SERVICE, AND PROGRAM STORAGE MEDIUM

BACKGROUND OF THE INVENTION

Field of the Invention

The present invention relates to an image processing apparatus, a method of providing a cloud print service, and a program storage medium.

Description of the Related Art

A printing system in which a print job that is put via a cloud is transmitted to an image processing apparatus such as a printing apparatus and executed has been proposed (for example, Japanese Patent Laid-Open No. 2012-133489). In such a printing system that performs cloud printing, an administrator registers a printing apparatus in a cloud print service (hereinafter, also referred to as a CPS). Thereafter, a user who is permitted to use the cloud print service uses an individual client terminal to search for printers registered in the CPS, add the printers, set desired print settings, and transmit a print job to the CPS. When the print job is executed, the CPS outputs the print job to the printing apparatus, and the printing apparatus executes printing on the basis of the output print job.

Examples of the above printing system are referred to in PWGS100.18, RFC3995, and RFC3996. These standards also define a method in which a cloud print service notifies a printing apparatus of an event. As one method for realizing a notification, a notification method is defined in which a printing apparatus periodically makes an inquiry to a cloud print service and receives an event notification in response to the inquiry. A notification method is also defined in which a printing apparatus and a CPS are always connected, and when an event occurs in the CPS, the printing apparatus is notified of the event through a push notification.

If a cloud print service is used on an organizational basis, printers owned by the organization are registered in the cloud print service. For example, organizations such as big companies and government offices often own a large number of printers, and many printers are registered in the cloud print service.

In the above environment, if a user searches for printing apparatuses registered in the cloud print service from a client terminal, dozens or hundreds of printing apparatuses are displayed in a search result, and it is difficult to find a desired printing apparatus.

It is conceivable to generate a virtual printer on a cloud print service for collectively managing a plurality of printing apparatuses as one printer and to display the virtual printer as a representative of a plurality of printing apparatuses in a search result.

However, if a large number of printing apparatuses are simply associated with a virtual printer, a load may concentrate on a software module that realizes the virtual printer. For example, a plurality of printing apparatuses may make a request for acquisition of print job data to the same virtual printer. In this case, a plurality of data accesses may concentrate on the virtual printer on the cloud print service for a long time. Specifically, while a printing apparatus A acquires print job data input by a user A, a printing apparatus B may acquire print job data input by another user B in response to a request from the user B. If these multiple accesses or data transmission/reception control is supported with a virtual printer that is a single software module, delays in communication and performance may be caused.

SUMMARY OF THE INVENTION

According to an embodiment of the present invention, there is provided a method of providing a cloud print service. The method includes setting a correspondence relationship between a virtual printer and one or more registered printers on the basis of a user operation; if a predetermined request for designating a print job stored in a queue of the virtual printer as a target is received from a first registered printer for which the correspondence relationship is set, moving the print job designated as the target to a queue of the first registered printer; and if a request for acquiring the print job stored in the queue of the first registered printer is received from the first printer, transmitting the print job corresponding to the request to the first registered printer.

Further features of the present invention will become apparent from the following description of exemplary embodiments with reference to the attached drawings.

BRIEF DESCRIPTION OF THE DRAWINGS

FIG. 8 is a diagram illustrating an example of a printer list managed by the cloud print service.

FIGS. 15A to 15F are diagrams illustrating examples of packets exchanged during cloud printing.

FIG. 18 is a diagram illustrating an example of a process of setting a virtual printer.

FIGS. 21A to 21C are diagrams illustrating examples of setting screens of the cloud print service.

FIG. 24 is a diagram illustrating an example of a packet used for an association notification.

DESCRIPTION OF THE EMBODIMENTS

First Embodiment

<System Configuration>

Figure 1:
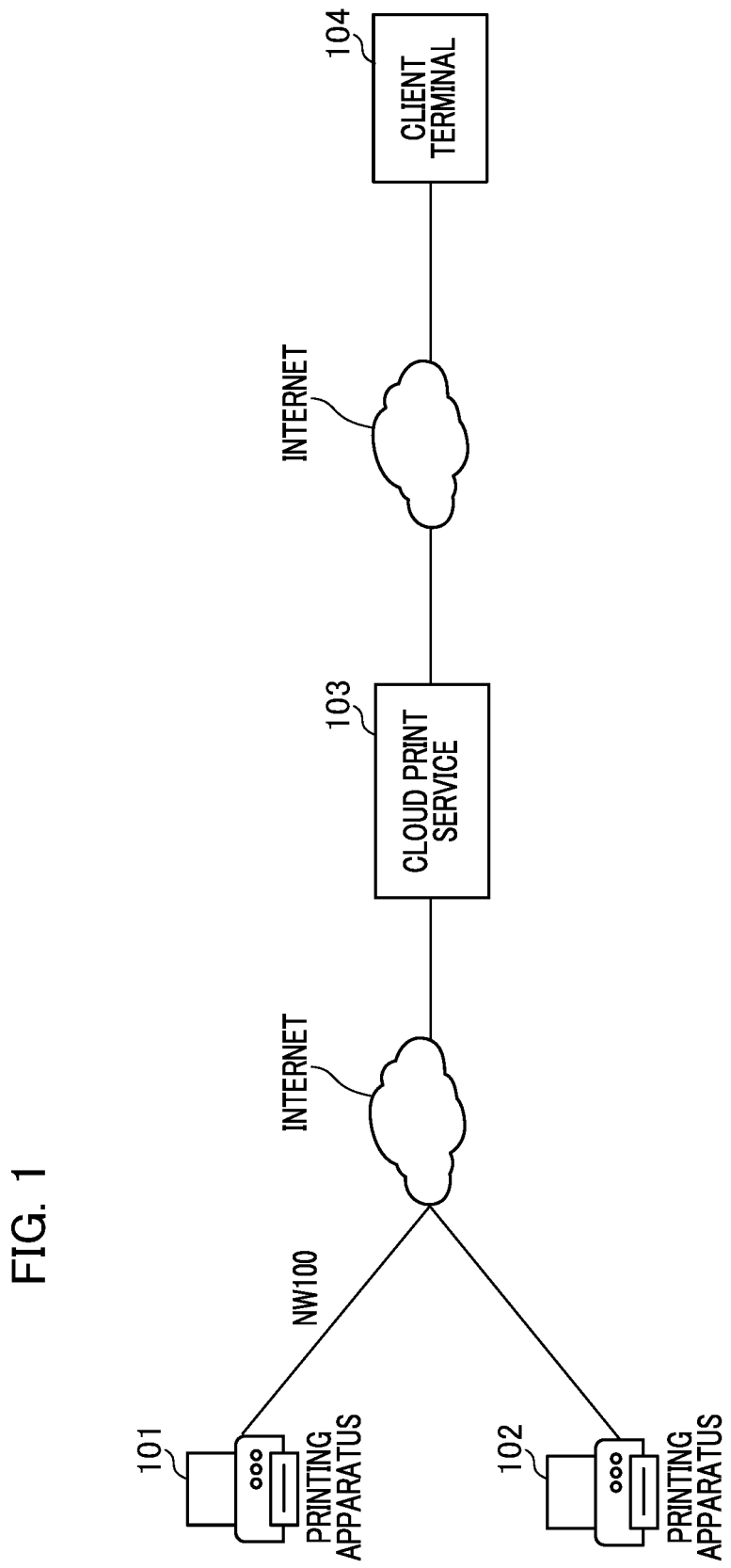
FIG. 1 is a diagram illustrating an example of a printing system.

FIG. 1 is a block diagram illustrating a system configuration of the present embodiment.

In the present embodiment, a printing apparatus instructs a virtual printer on a cloud print service to move a print job corresponding to a user of the printing apparatus to a printer queue of the printing apparatus.

The system illustrated in FIG. 1 includes a plurality of printing apparatuses 101 and 102, a cloud print service 103, and a client terminal 104. The client terminal 104 is a computer that puts a print job into the cloud print service 103 in response to a user's operation. The cloud print service 103 is a service of storing a job (for example, a print job) related to image processing received from a client terminal and outputting the job to a printing apparatus in response to a request from the printing apparatus. Each service provided by the cloud print service 103 is realized by server resources configuring a so-called general-purpose computer, such as a processor, a memory, and a storage for realizing a process of the present embodiment. The cloud print service 103 may be realized by, for example, a computing resource provided by a virtual machine (cloud service), and may be realized by an information processing apparatus such as a server apparatus. The cloud print service 103 may also be realized by a plurality of server apparatuses in cooperation or the like. An application range of the present invention is not limited to a print job for a printing process. In addition to the printing process, the present invention may be applied to jobs related to any image processing such as an image data reading process, a processing/editing process, and a posting process to a message sharing system.

Next, with reference to FIGS. 2 and 3, registration of a printer to the cloud print service 103 and printing using the cloud will be described briefly.

Figure 2:
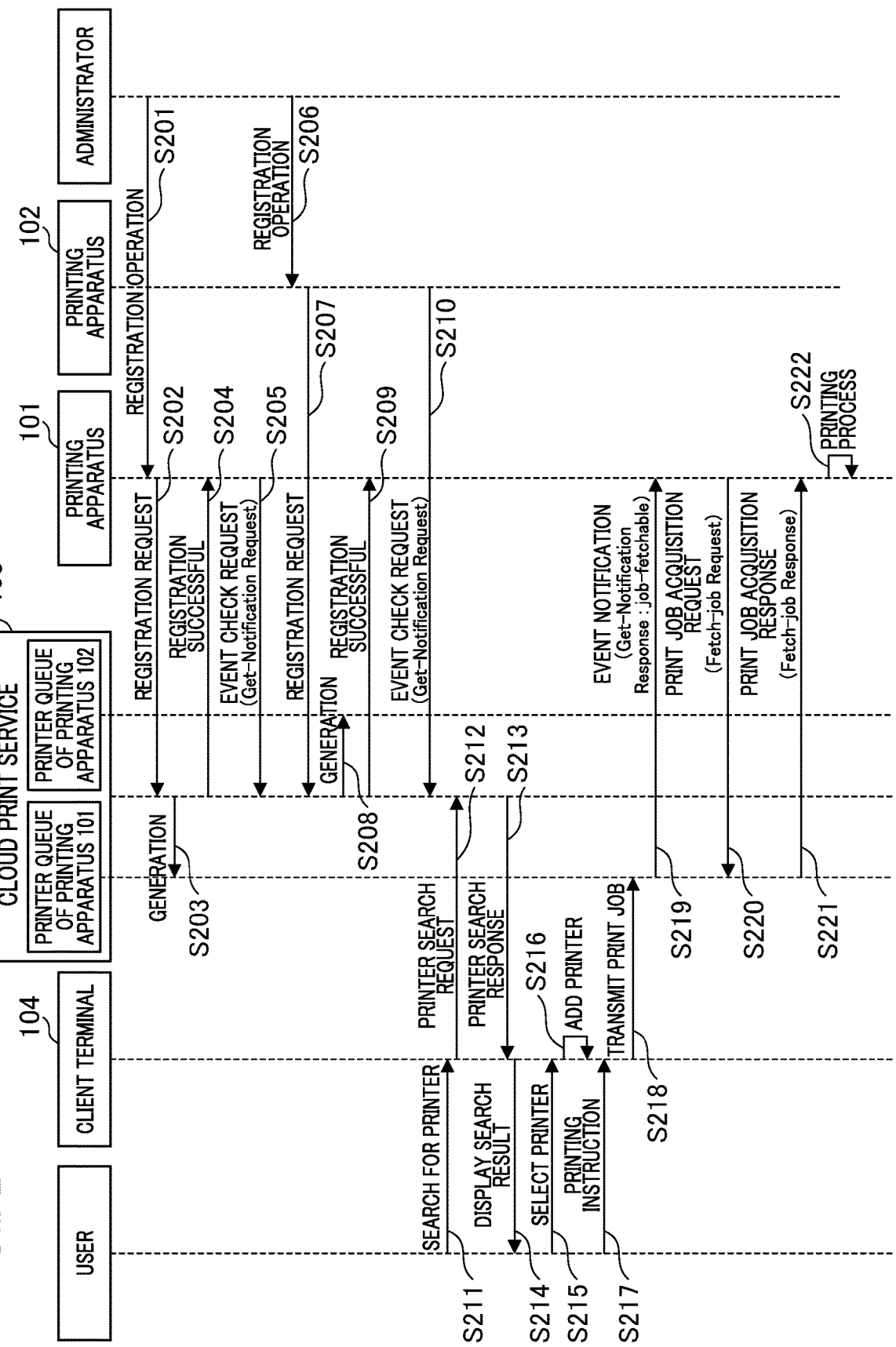
FIG. 2 is a diagram illustrating an example of a printing process using a cloud print service.
Figure 3:
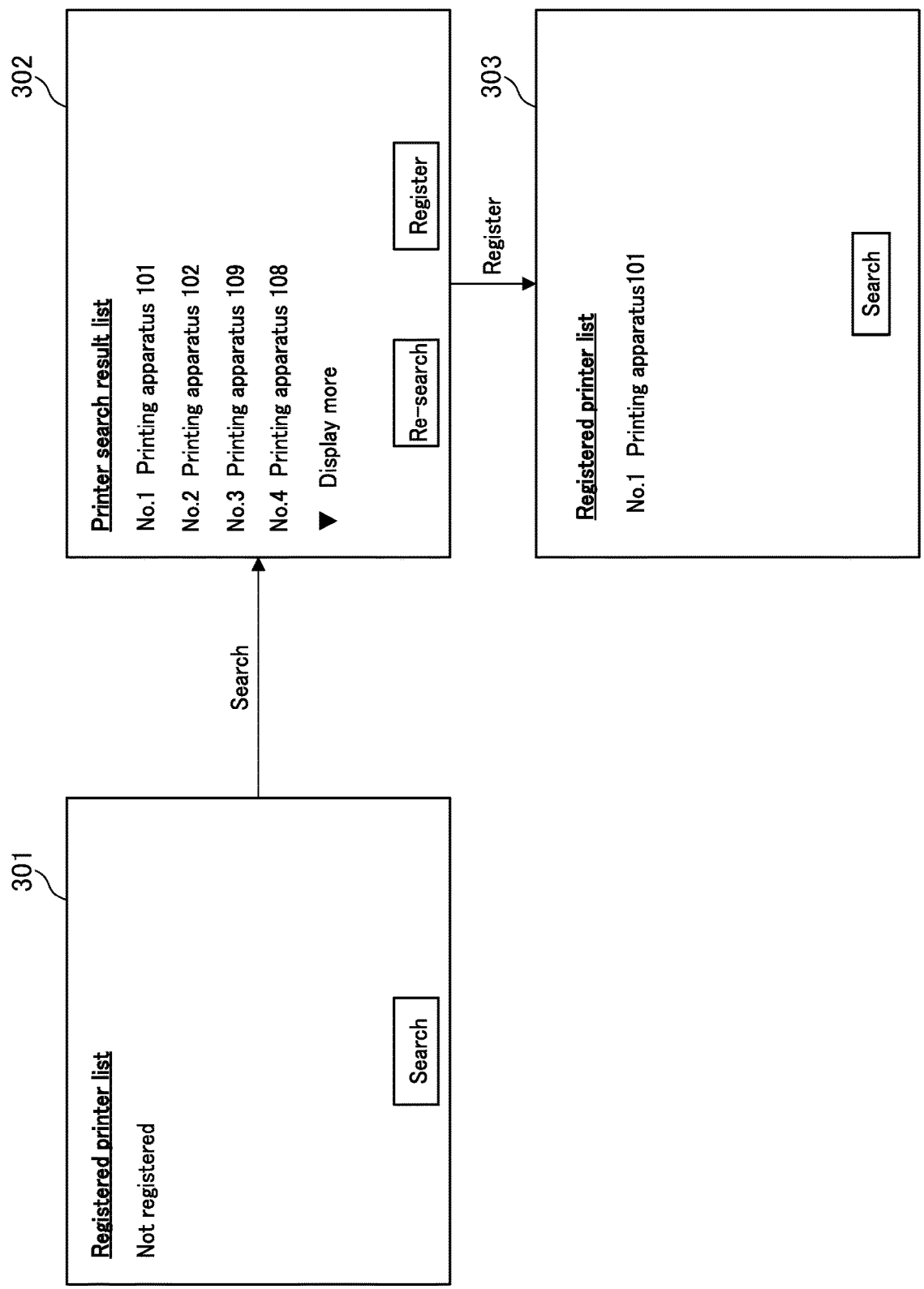
FIG. 3 is a diagram illustrating an example of a screen related to printer search.

An administrator registers each of the printing apparatuses 101 and 102 in the cloud print service 103 (S201 to S210 in FIG. 2). Consequently, a printer queue of each printing apparatus is generated on the cloud print service. When a user operates the client terminal 104 to request the cloud print service 103 to search for a printer, search results are displayed (S211 to S214). For example, a printer search is performed by operating a screen 301 in FIG. 3, and search results are displayed as shown in a screen 302. When the user selects a printing apparatus from the search results, the printing apparatus is registered and displayed on a screen 303 (S215 and S216 in FIG. 2). When the registration is completed, the user can perform printing via the cloud print service 103 by using the printing apparatus registered on the client terminal. The user selects the printing apparatus on the cloud print service as an output destination printer and gives a printing instruction. The client terminal 104 generates print data on the basis of print target data. A print job including the generated print data and print settings is transmitted to the cloud print service 103 (S217 and S218 in FIG. 2). When the print job is put in the printer queue of the cloud print service 103, an event is reported to the printing apparatus 101 that is a printer corresponding to the queue on a one-to-one basis. The printing apparatus 101 having received the event notification acquires the print job from the printer queue on the cloud print service 103 and executes a printing process (S219 to S222).

The cloud print service 103 of the present embodiment provides a function of managing a plurality of printing apparatuses under the cloud print service 103 in association with one virtual printer. The virtual printer and the association will be described later.

FIG. 1 will be referred to again. The printing apparatus 101 or 102 is an example of an image processing apparatus that acquires a job (print job) related to image processing from the cloud print service 103 and executes the image processing. Image processing apparatuses to which the present invention is applicable are, for example, a printer, a copying machine, a digital multi-function peripheral, and a 3D printer. The printing apparatuses 101 and 102 and the cloud print service 103 are communicatively connected to each other via a network (NW) 100 and the Internet. The client terminal 104 and the cloud print service 103 are communicatively connected to each other via the Internet. The number of printing apparatuses is not limited to two.

<Hardware Configuration of Printing Apparatus>

Figure 4:
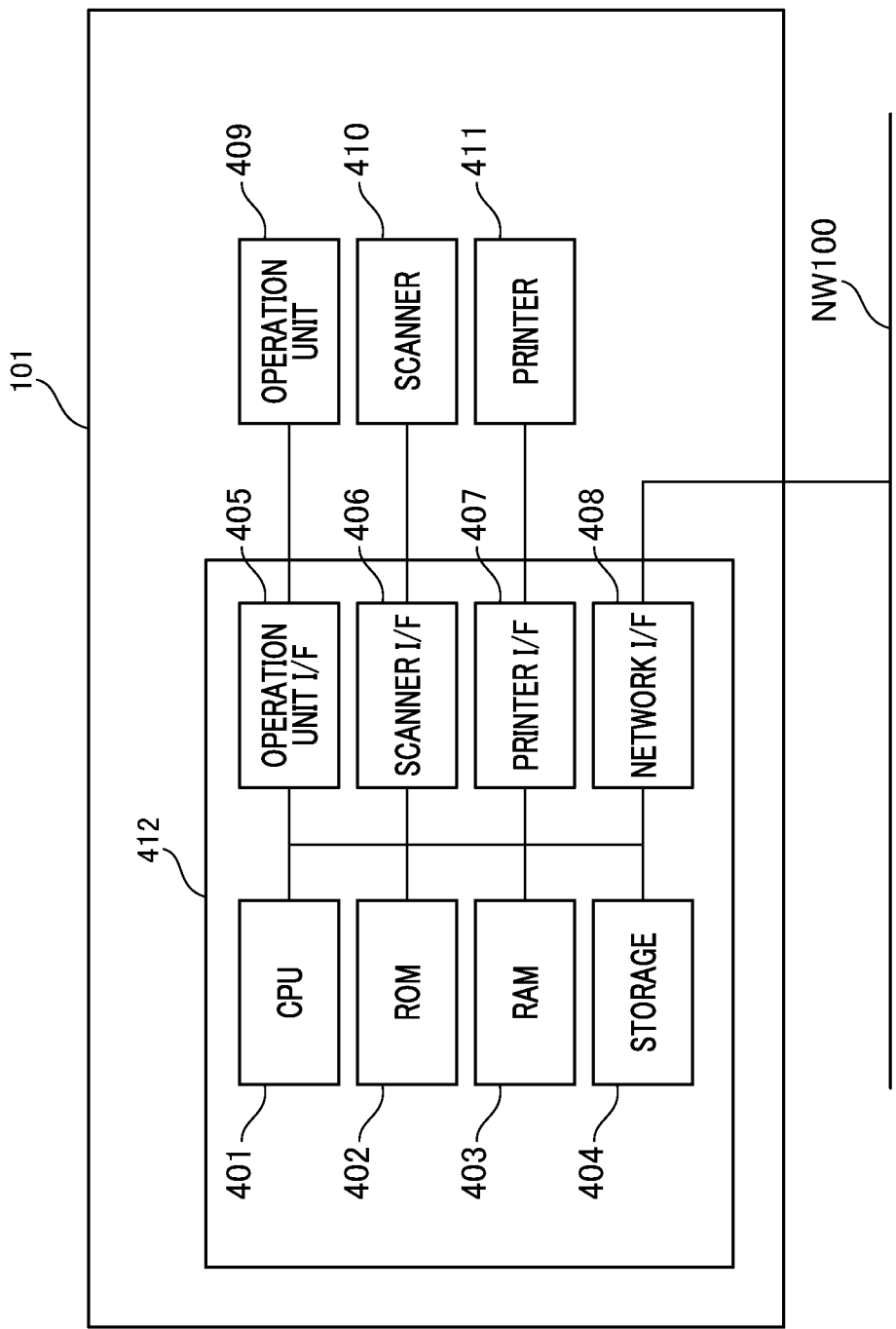
FIG. 4 is a schematic diagram illustrating an example of a hardware configuration of a printing apparatus.

FIG. 4 is a schematic diagram illustrating an example of a hardware configuration of the printing apparatus.

The printing apparatus 101 includes a control unit 412, an operation unit 409, a scanner 410, and a printer 411. The control unit 412 has a CPU 401 to a network I/F 408, and controls the overall printing apparatus 101. The operation unit 409 is a touch-operable display, and displays various setting screens according to the present embodiment. A user or an administrator may perform various settings by operating the operation unit 409. The scanner 410 is a scan engine that scans image data. The printer 411 is a printer engine that prints an image on a sheet on the basis of a print job received from an external apparatus via the network I/F 408. The printer 411 prints a print image based on a print job received from an external apparatus or the cloud print service 103 on a sheet such as paper. The printed sheet is output to an output tray (not illustrated).

The control unit 412 including the central processing unit (CPU) 401 controls an operation of the overall printing apparatus 101. The CPU 401 reads and executes a control program stored in the ROM 402 or the storage 404, and directly or indirectly controls each processing unit of the printing apparatus 101. A basic input/output system (BIOS) is stored in the ROM 402. ROM stands for read only memory.

The RAM 403 is a storage device that is used as a work area of the CPU 401 or as a primary storage for loading a software module for realizing the present invention. RAM stands for random access memory. The storage 404 is a storage device such as an HDD or an SSD in which an operating system (OS) that is basic software and the software module are stored. HDD stands for hard disk drive. SSD stands for solid state drive. The storage 404 also stores image data, print data, various setting information of the printing apparatus 101, and the like.

As described above, the hardware such as the CPU 401, the ROM 402, the RAM 403, and the storage 404 configure a so-called computer. The printing apparatus 101 may further include an ASIC or the like that renders print data. In the present embodiment, for the sake of description, a case where a single processor (CPU 401) executes each process shown in the flowchart that will be described later using a single memory (RAM 403) is exemplified, but other modes may be used. For example, a plurality of processors, RAMs, ROMs, and storages may be cooperated to execute each process shown in a flowchart that will be described later. Processes such as a printing process, a reading process, and a data transmission/reception process are realized in cooperation with hardware connected to an I/F.

The computer that functions as a real resource that provides the cloud print service 103 also has the same constituents as the CPU 401 to the storage 404 and the network I/F 408 included in the control unit 412. The computer that functions as the real resource provides each function of the cloud print service by reading a software module group that provides the function of the cloud print service into the memory and executing the software module group with the processor.

The printing apparatus 101 will be further described. The scanner I/F 406 mediates communication between the control unit 412 and the scanner 410. The printer I/F 407 mediates communication between the control unit 412 and the printer 411. The network I/F 408 is an interface for connection to the NW 100, the Internet, a local area network (LAN) of an office, or the like. A configuration of the printing apparatus 102 is the same as that of the printing apparatus 101.

<Software Configuration of Printing Apparatus>

Figure 5:
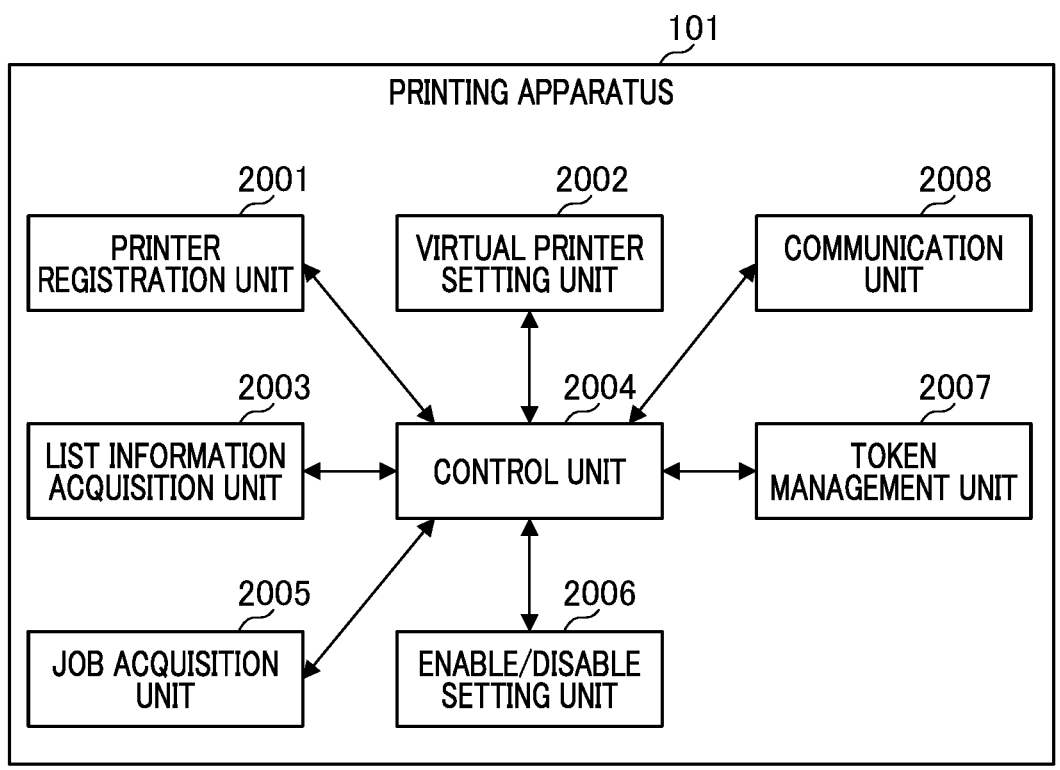
FIG. 5 is an example of a functional block diagram of the printing apparatus.

FIG. 5 is an example of a functional block diagram of the printing apparatus.

FIG. 5 illustrates principal processing units for implementing the present invention. A function of each processing unit of the printing apparatus 101 illustrated in FIG. 5 is realized by the CPU 401 in FIG. 4 executing a program for implementing the present invention.

The printing apparatus 101 includes a printer registration unit 2001, a virtual printer setting unit 2002, a list information acquisition unit 2003, a control unit 2004, a job acquisition unit 2005, an enable/disable setting unit 2006, a token management unit 2007, and a communication unit 2008.

The printer registration unit 2001 registers the printing apparatus 101 in the cloud print service 103, and generates a printer object that stores a print job to be transmitted to the printing apparatus 101 on the cloud print service 103. The printer object is a software module having a printer queue for the printing apparatus 101 that temporarily spools a print job received from the outside and a function of transferring the spooled print job to the printing apparatus 101 having a printer engine that is a physical resource. The process of registering the printing apparatus 101 is executed, for example, according to a method shown in S201 to S204 of FIG. 2. That is, when the printer registration unit 2001 makes a registration request for a printer (printing apparatus 101) via the communication unit 2008, the printing apparatus 101 is registered as a printer under the cloud print service 103. When the registration is completed, a printer object for transferring a print job to the printing apparatus 101 is generated in the cloud print service 103. An access token (first access token) for accessing the cloud print service 103 and an inquiry destination URL are issued.

When a print job is put in the printer queue for the printing apparatus 101, the cloud print service 103 notifies the printing apparatus 101 that a new printing job has occurred (S219). The printing apparatus 101 having received the notification transmits an acquisition request for a print job including the first access token to the cloud print service 103 (S220). The cloud print service 103 having received the acquisition request verifies the access token and determines whether the request is legitimate. If it is determined that the request is legitimate, a print job is transmitted to the printing apparatus 101 in response to the acquisition request. The printing apparatus 101 prints an image on a sheet on the basis of the print job received from the cloud print service 103. When printing based on the print job is complete, the job is removed from the printer queue. As described above, the print job put in the printer queue for the printing apparatus 101 is sequentially transferred to the printing apparatus 101.

Next, a virtual printer function in the cloud print system of the present embodiment will be described. On the cloud print service 103, a virtual printer object may be generated for the purpose of collectively managing a plurality of image processing apparatuses as one printer. Hereinafter, for the sake of description, a virtual printer object provided on the cloud print service 103 in order to collectively manage a plurality of image processing apparatuses as one printer will be referred to as a virtual printer. The virtual printer may be associated with one or more subordinate real printer apparatuses, print servers, or the like that actually performs printing. On the other hand, a queue of the virtual printer (virtual printer queue) is configured such that an output destination of a print job is not linked thereto. Therefore, a print job put in the virtual printer queue is retained in the queue.

On the other hand, the virtual printer is configured to appropriately respond to inquiries about information regarding the virtual printer queue from an associated printing apparatus (for example, the printing apparatus 101). The printing apparatus 101 associated with the virtual printer may acquire list information indicating bibliographic items of print jobs put in the virtual printer queue. That is, the virtual printer functions as a front-end module that receives and temporarily stores print jobs, and also exchanges bibliographic information with a real printer until an actual printing request is received from a subordinate printing apparatus.

In the present embodiment, in order to prevent a load from concentrating on the software module configuring the virtual printer, a printer object prepared for a real printer, which is another software module, is caused to output a print job managed by the virtual printer. Specifically, the cloud print service 103 executes the following process when a predetermined request (movement request) for designating a print job stored in the virtual printer queue as a target is received from the printing apparatus. The cloud print service 103 moves the print job designated as the target to the printer queue (printer queue for the real printer) provided for the printing apparatus (job control step). When the movement is completed, the moved print job becomes a print job managed by the printer object provided for the real printer. If the cloud print service 103 receives a request for acquiring a print job stored in the printer queue provided for the printing apparatus from the printing apparatus, the cloud print service 103 transmits a print job corresponding to the request to the printing apparatus (transmission control step). Consequently, print jobs put in the printer queue for the real printer are sequentially transferred to the real printer and printed. That is, the large-sized data communication occurring with the real printer is performed by the printer object prepared for the real printer instead of the virtual printer.

This refers to that the printer object that is a software module prepared for a real printer having a one-to-one correspondence between a printer queue and an output destination functions as a back-end module for load balancing. In other words, in the service 103, a process of the software module that realizes the virtual printer and a process of the software module that realizes the printer object for the real printer are operated independently in separate processes. Therefore, it is possible to prevent a load from concentrating on the process for realizing the virtual printer. Hereinafter, a specific control method will be described.

The virtual printer setting unit 2002 sets a virtual printer on the cloud print service 103 in association with the printing apparatus 101 registered in the cloud print service 103. The setting unit 2002 transmits a request indicating that the printing apparatus wants to belong to the virtual printer to the cloud print service 103. The cloud print service 103 associates the printing apparatus 101 with the virtual printer on the basis of the request and a correspondence relationship defined in advance by the administrator. The association will be described with reference to FIG. 8.

When the setting for associating the virtual printer with the printing apparatus 101 registered in the cloud print service 103 is completed, an access token (second access token) for accessing the cloud print service is issued. The second access token is stored in the token management unit 2007. This second access token is used to make an inquiry about the virtual printer. When the association is completed, the service 103 issues an inquiry destination URL to be used to make an inquiry about the virtual printer.

If the printing apparatus 101 is associated with the virtual printer on the cloud print service 103, the list information acquisition unit 2003 acquires information of print jobs managed by the virtual printer from the cloud print service 103. Specifically, the list information acquisition unit 2003 acquires list information of the print jobs corresponding to a user logged in to the printing apparatus 101 and managed by the virtual printer from the cloud print service 103. In the present embodiment, the list information refers to bibliographic items of a job (items for the user to specify the job, such as a job name, a file size, the job generation date and time, and print setting information). The list information acquisition unit 2003 transmits an acquisition request for print job list information to the virtual printer on the cloud print service 103 via the communication unit 2008. An access token (second access token) for accessing the virtual printer and an inquiry destination URL are used for the acquisition request for the print job list information. The cloud print service 103 specifies a target printer object on the basis of the URL used for the acquisition request. The cloud print service 103 returns the list information of the print jobs put in the printer queue of the specified printer object in response to the request for acquiring the list information of the print jobs. If it is determined that the request is not legitimate on the basis of the access token and the inquiry destination URL, information indicating an error is returned in response to the request.

The control unit 2004 controls the overall printing apparatus 101. As an example of a control process, if an operation for printing a print job managed by the virtual printer is received from the user, the control unit 2004 executes the following process. The control unit 2004 gives an instruction for moving a print job specified on the basis of at least the print job information acquired by the list information acquisition unit 2003 to a printer queue for an image processing apparatus (for the printing apparatus 101) provided on the cloud print service 103.

More specifically, first, the control unit 2004 functions as a display control unit and displays a job selection screen on the basis of the list information of print jobs. The control unit 2004 specifies one or more print jobs that are to be print targets on the basis of the user operation using the job selection screen. The control unit 2004 determines whether or not the print job specified as the print target includes a print job retained in the virtual printer of the cloud print service 103. If there is a print job retained in the virtual printer, a request for moving the print job to a printer queue that is provided for the printing apparatus 101 and is used to transfer the print job to the printing apparatus 101 is transmitted to the cloud print service 103. The cloud print service 103 moves (puts) the print target job stored in the virtual printer queue of the virtual printer to (into) the printer queue provided for the printing apparatus 101 in response to an instruction received from the printing apparatus 101. The communication unit 2008 executes communication with an external apparatus.

The job acquisition unit 2005 functions as a job acquisition unit configured to acquire a print job from the printer queue of the printing apparatus 101 registered in the cloud print service 103. Specifically, the job acquisition unit 2005 transmits a print job acquisition request to the cloud print service 103 via the communication unit 2008. The acquisition request includes the first access token. The printer object for the printing apparatus 101 operating on the cloud print service 103 transmits the corresponding print job stored in the printer queue for the printing apparatus 101 to the printing apparatus 101 in response to the print job acquisition request.

The enable/disable setting unit 2006 functions as a second setting unit configured to set whether or not to enable the use of the virtual printer on the cloud print service 103. If the use of the virtual printer is set to be enabled, the list information acquisition unit 2003 executes a process of acquiring the above-described print job list information from the virtual printer.

The token management unit 2007 manages the first access token used for accessing the printer queue and the second access token used for accessing the virtual printer. As described above, the first access token is acquired when the printer queue of the printing apparatus 101 is registered in the cloud print service 103. The second access token is acquired, for example, during a process of associating the virtual printer with the printing apparatus 101.

<User Account Management of Printing Apparatus>

Examples of setting screens for a printing apparatus according to the present embodiment will be described with reference to FIGS. 9 to 11B.

Figure 9:
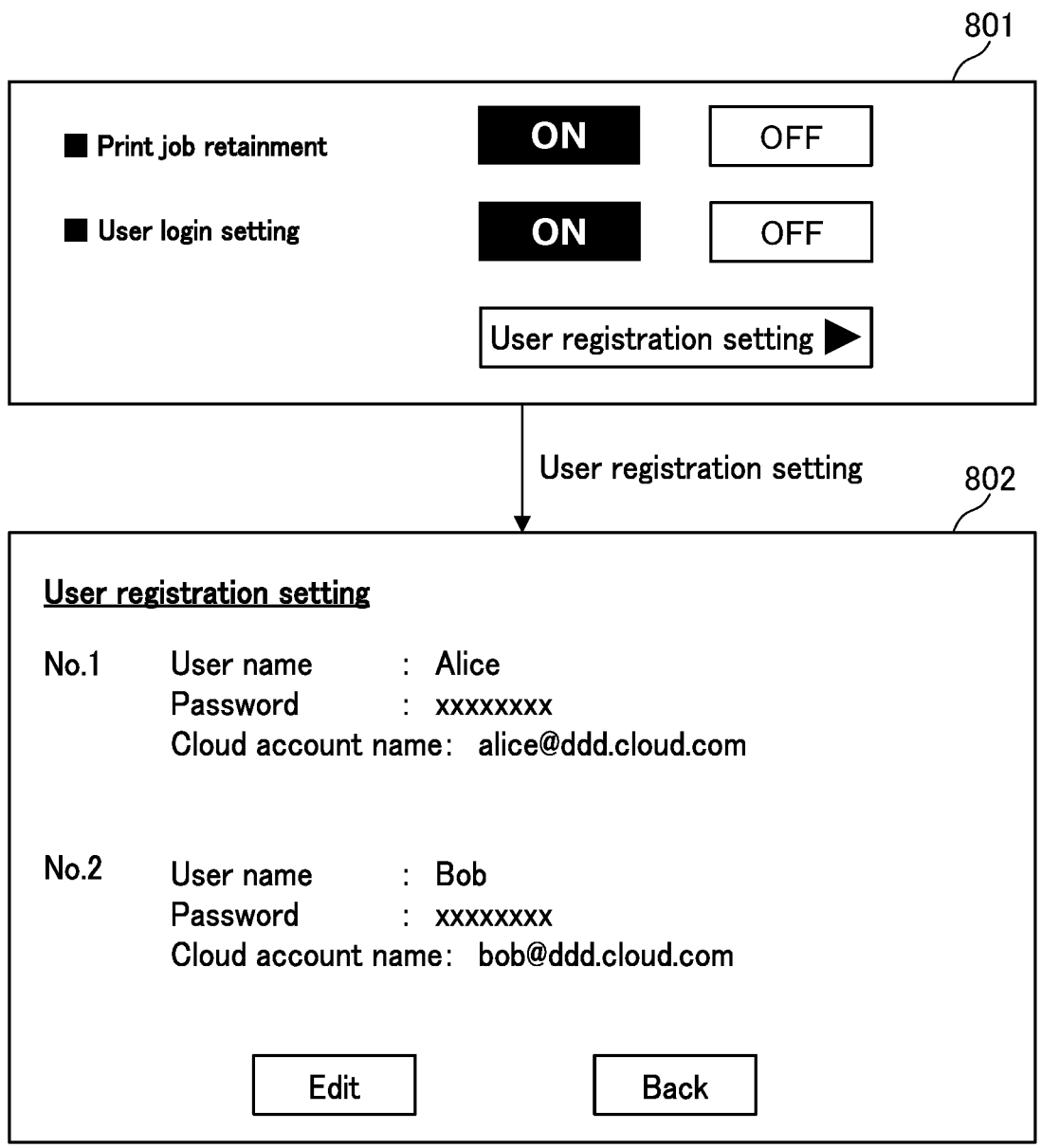
FIG. 9 is a diagram illustrating an example of a setting screen in the printing apparatus.
Figure 10A:
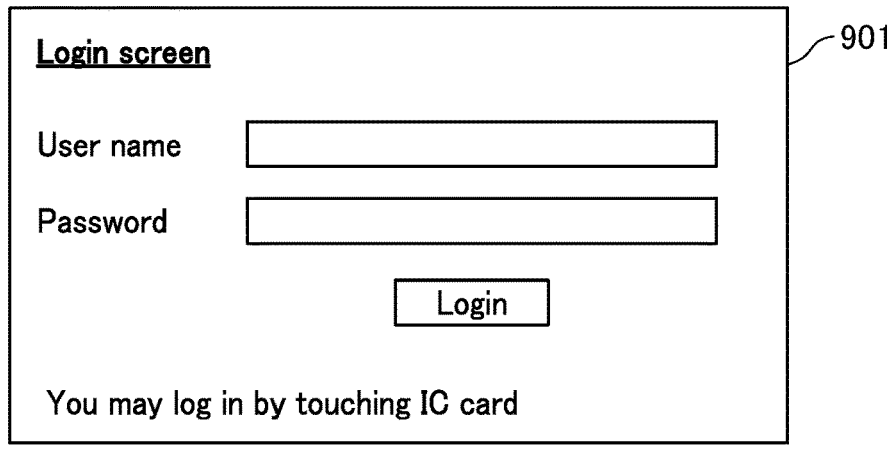
FIGS. 10A to 10C are diagrams illustrating examples of a login screen and screens displayed during login.
Figure 10B:
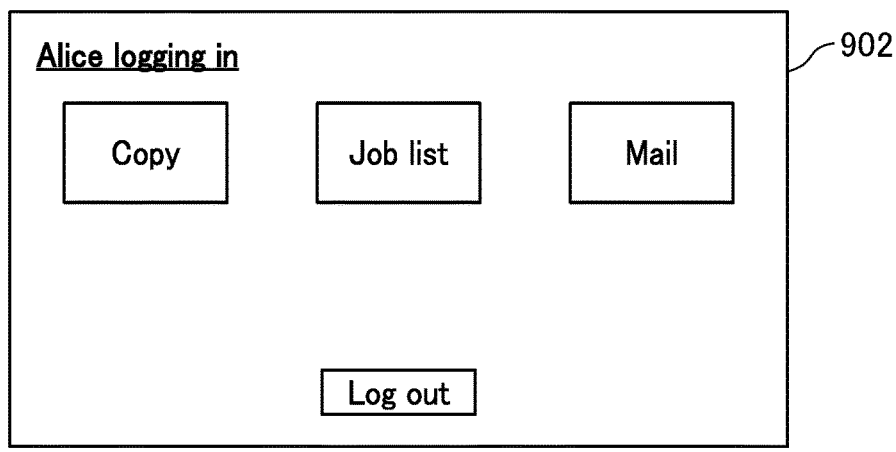
Figure 10C:
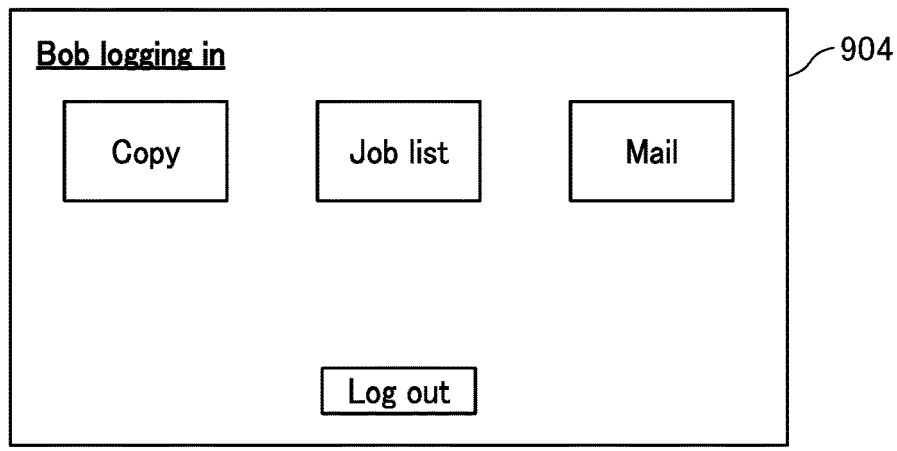
Figure 11A:
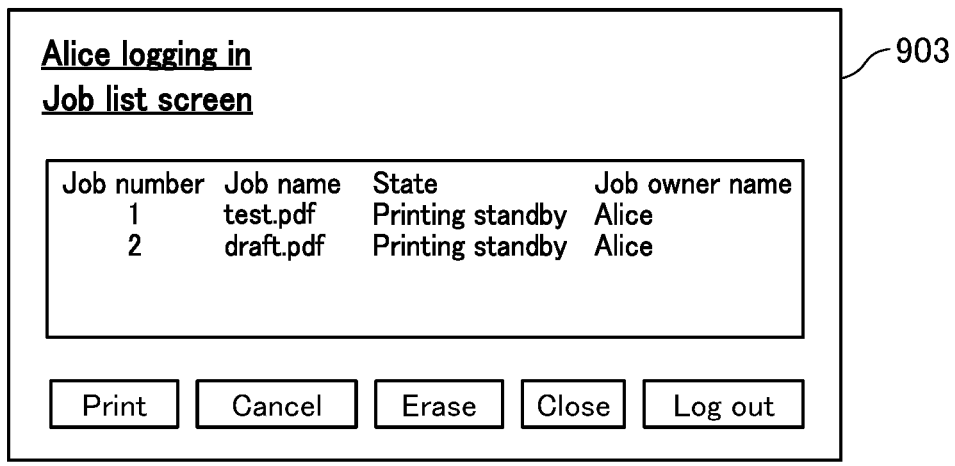
FIGS. 11A and 11B are diagrams illustrating examples of job list screens.
Figure 11B:
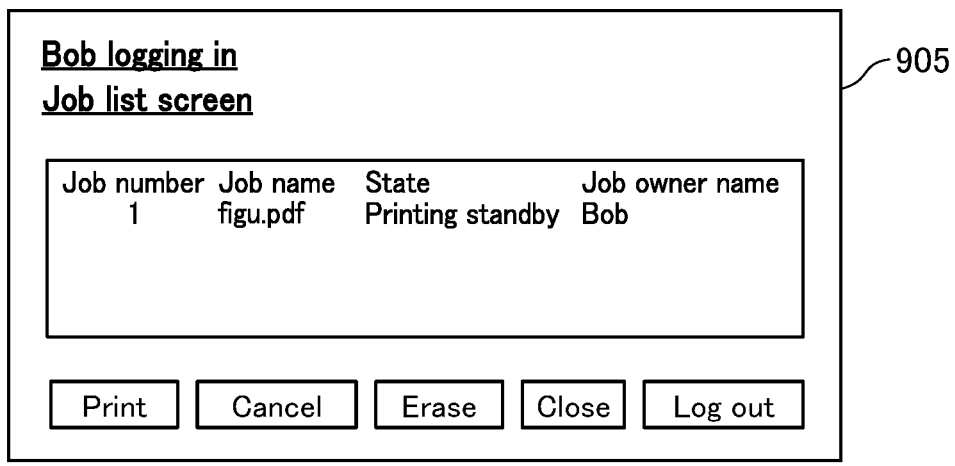

FIG. 9 is a diagram illustrating examples of a print job retainment setting screen and a user account setting screen in the printing apparatus. FIGS. 10A to 10C are diagrams illustrating examples of a login screen and a screen displayed during login. FIGS. 11A and 11B are diagrams illustrating examples of job list screens.

"Print job retainment setting" on a print job retainment setting screen 801 in FIG. 9 is a setting item for setting whether the printing apparatus 101 immediately ejects a received print job or stores the received print job in the storage of the printing apparatus 101 and ejects the print job when there is an instruction from a user. When this setting is enabled, the CPU 401 (FIG. 4) performs control for storing the received print job in the storage 404 of the printing apparatus 101.

"User login setting" is a setting item for setting whether or not to perform user authentication if the operation unit 409 of the printing apparatus 101 is used. If this setting is enabled, for example, as illustrated in FIG. 10A, a login screen 901 for entering a user name and a password is displayed, and control is performed such that only a user who has succeeded in authentication is allowed to use the printing apparatus. Login may be performed by using other means such as authentication using an IC card.

In FIG. 9, when the "user registration setting" is selected, a user registration setting screen 802 is displayed. A user managed by the printing apparatus 101 can be added/deleted/edited through an operation using the user registration setting screen 802. In this screen example, two users are registered in the printing apparatus 101, and "Alice" and "Bob" are user names registered in the printing apparatus 101. Therefore, if Alice logs in to the printing apparatus 101, the user enters "Alice" in the user name to log in. A "cloud account name" is a setting item for setting an account name registered in the cloud print service 103. A user name managed by the printing apparatus 101 and an account name managed by the cloud print service 103 may or may not match.

When Alice logs in to the printing apparatus 101, a screen 902 illustrated in FIG. 10B is displayed. A job list screen 903 in FIG. 11A is a screen on which a list (list information) of print jobs corresponding to logged-in Alice is displayed. When Bob logs in to the printing apparatus 101, a screen 904 illustrated in FIG. 10C is displayed. A job list screen 905 in FIG. 11B is a screen on which a list (list information) of print jobs corresponding to logged-in Bob is displayed.

<Whole Sequence>

Figure 6:
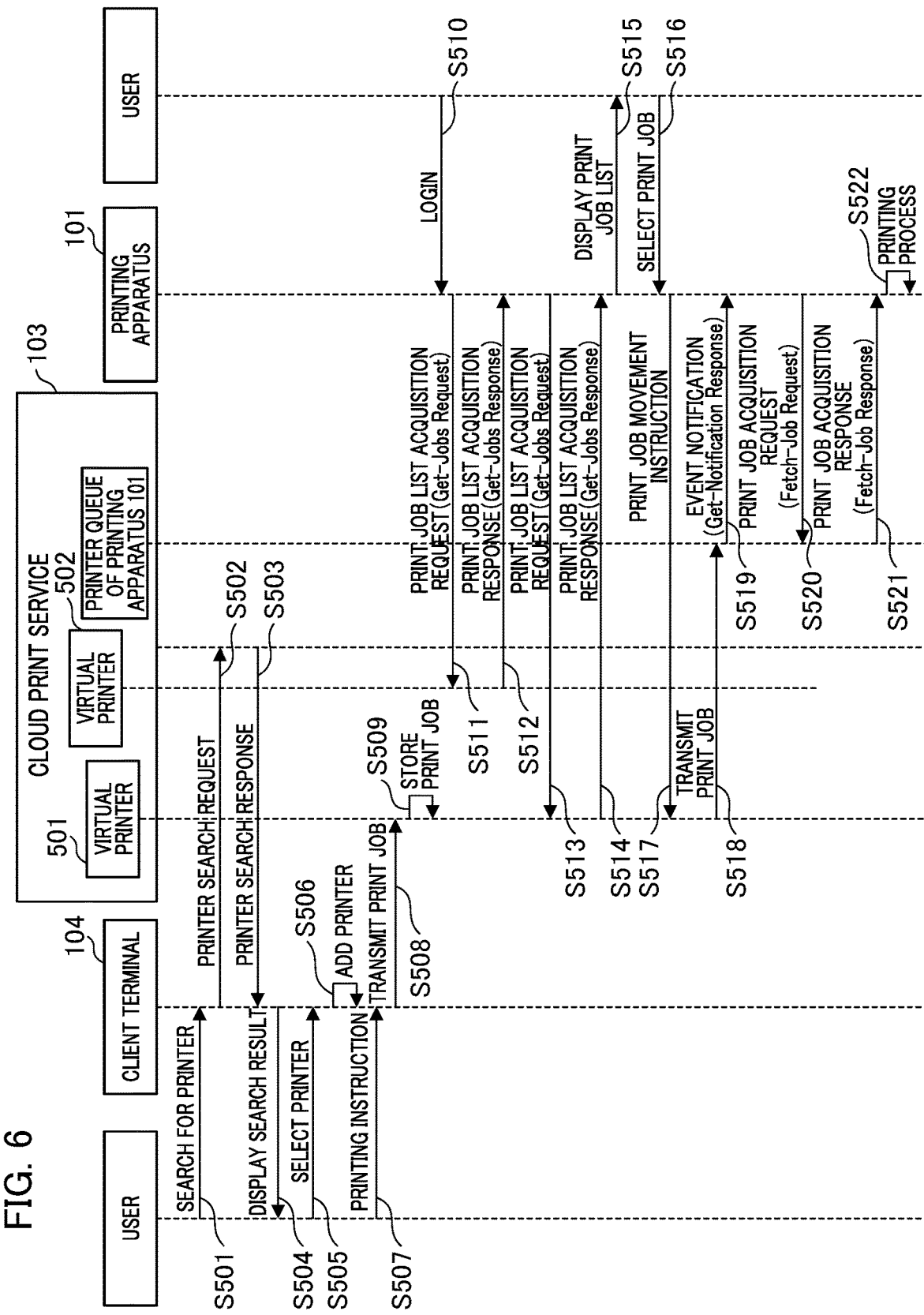
FIG. 6 is a diagram illustrating an example of processes in the overall system.
Figure 7:
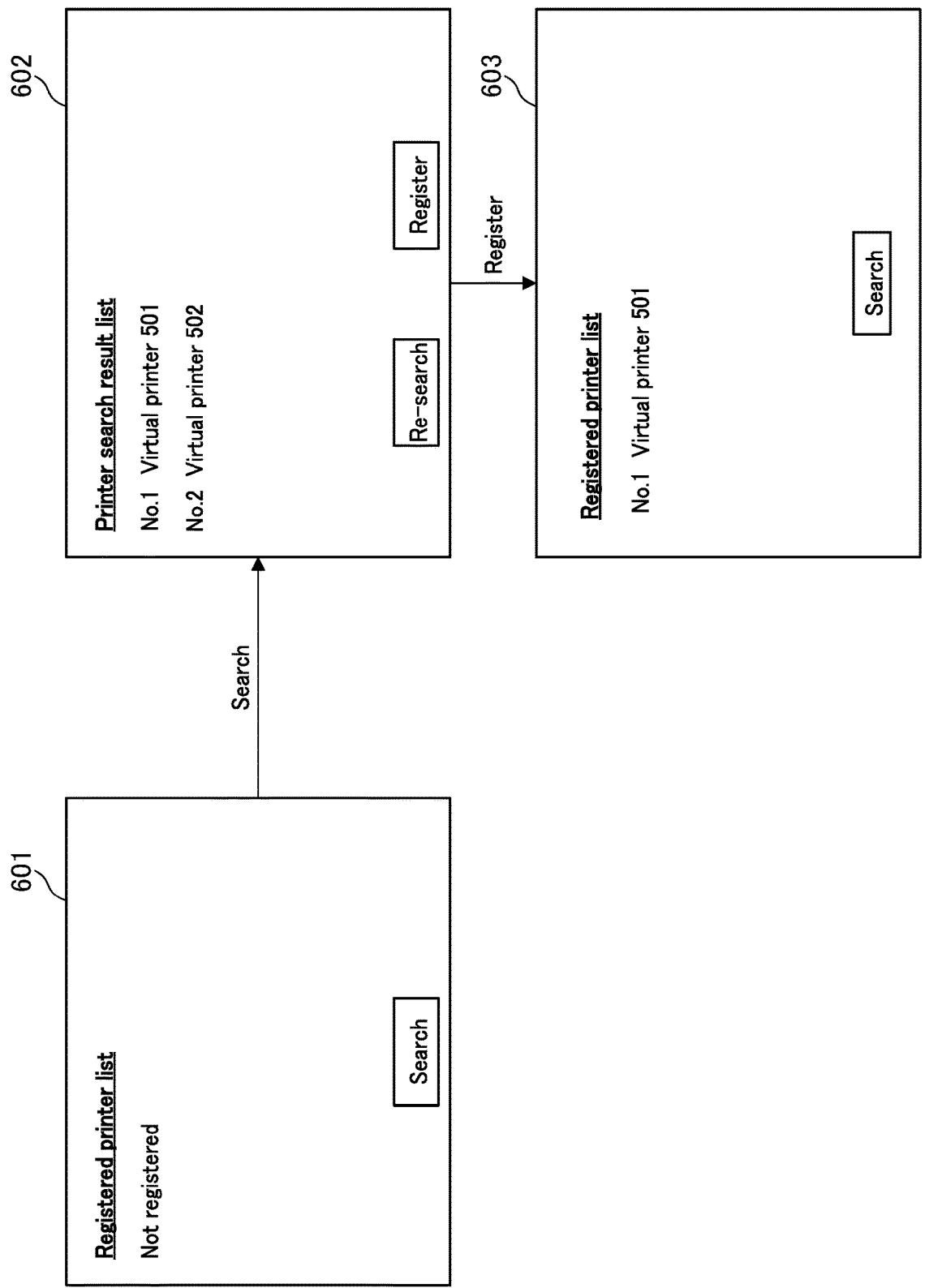
FIG. 7 is a diagram illustrating an example of a screen that is displayed when searching for a virtual printer.

FIG. 6 is a diagram illustrating an example of processes in the overall system of the present embodiment. FIG. 7 is a diagram illustrating an example of a screen displayed when searching for a virtual printer. FIG. 8 is a diagram illustrating an example of a list of printers managed by the cloud print service.

In the present embodiment, a protocol such as an Internet printing protocol (IPP) is used.

A process in which a user searches for and adds a virtual printer registered in the cloud print service 103 will be described. First, in S501, the client terminal 104 searches for a printer of the cloud print service 103 in response to an operation of the user. A screen 601 illustrated in FIG. 7 is a screen used for searching for a printer.

In S502, when a printer search instruction from the user is detected, the client terminal 104 transmits a printer search request to a cloud tenant associated with the user. In S503, the cloud print service 103 returns a printer list indicating search results of printers to the client terminal 104. In S504, the client terminal 104 displays the received printer list as shown in a screen 602 in FIG. 7. Here, a printer (printing apparatus) included in the printer list acquired from the cloud print service 103 is, for example, a printer for which a sharing setting is enabled on the cloud print service 103 side, as shown in 701 in FIG. 8. In the example illustrated in FIG. 8, sharing settings corresponding to virtual printers 501 and 502 are enabled. Therefore, the virtual printers 501 and 502 are included in the returned printer list. It is assumed that the virtual printer illustrated in FIG. 8 and a relationship between the printers to be associated with the virtual printer are defined in advance by a tenant administrator which is the service usage unit. For example, the tenant administrator generates a setting file that lists a definition of the name of the virtual printer, a definition of a printer associated with the virtual printer, a sharing setting of each printer, and the like. Next, the tenant administrator logs in to the cloud print service 103 and uploads the setting file to a tenant of the administrator. The cloud print service 103 builds the correspondence relationship exemplified in FIG. 8 on the basis of the setting file. When a setting request is received from the virtual printer setting unit 2002 of a printing apparatus (for example, the printing apparatus 101), the cloud print service 103 builds a correspondence relationship based on the setting file. For example, a process of associating the printing apparatus 101 with the virtual printers 501 and 502, and a process of issuing an inquiry URL and an access token for the printing apparatus 101 to access each virtual printer are performed.

In S505, the user selects a desired printer from among the printers included in the displayed printer list. In S506, when it is detected that any one printer has been selected from among the printers included in the printer list, the client terminal 104 performs a process of adding the corresponding printer to the client terminal 104. When the printer adding process is completed, the client terminal 104 displays a screen 603 in FIG. 7 indicating that the registration has been completed. In the example shown on the screen 603, the virtual printer 501 is registered.

A plurality of printers (printing apparatuses) are registered in the cloud print service 103, but are not included in a response to be sent to the client terminal 104 by setting the sharing setting to be disabled. The sharing setting only for the virtual printer in which a plurality of printing apparatuses are combined is set to be enabled, and thus only a limited number of virtual printers are included in a response to be sent to the client terminal 104. Therefore, since a huge number of printers are not displayed as search results in response to the printer search request, the user can easily search for a desired printer.

Next, in S507, the user selects any document and gives a print instruction. In S508, the client terminal 104 having received the print instruction transmits the print job to the virtual printer 501. In S509, the virtual printer 501 having received the print job stores the print job in a cloud storage (virtual printer queue). Consequently, the print job is put into the virtual printer 501. In the example illustrated in FIG. 7, printing apparatuses associated with the virtual printer 501 are four printing apparatuses 101, 102, 108, and 109. The print job is stored in the cloud print service 103 until a print job acquisition request is sent from any of these four printing apparatuses. The association between a virtual printer and a printing apparatus will be described later.

Next, a method of outputting a print job stored in the cloud print service 103 will be described. In S510 in FIG. 6, the user logs in to any printing apparatus. In the present embodiment, it is assumed that the user has logged in to the printing apparatus 101. In the example illustrated in FIG. 8, the printing apparatus 101 is associated with the virtual printers 501 and 502. Therefore, in S511, the CPU 401 of the printing apparatus 101 requests the virtual printer 502 to acquire list information of print jobs corresponding to the logged-in user. Specifically, the CPU 401 transmits an acquisition request to which an access token managed for the virtual printer 502 is attached to an inquiry URL acquired when the printing apparatus 101 is associated with the virtual printer 502. The acquisition request also includes information for specifying a user account.

In S513, the CPU 401 of the printing apparatus 101 requests the virtual printer 501 to acquire the list information of the print jobs corresponding to the logged-in user. Specifically, the CPU 401 transmits an acquisition request to which an access token managed for the virtual printer 501 is attached to an inquiry URL acquired when the printing apparatus 101 is associated with the virtual printer 501. The acquisition request also includes information for specifying the user account.

The acquisition request for the list information of the print jobs may be made by using, for example, an operation defined in the IPP called "Get-Jobs".

FIGS. 15A to 15F are diagrams illustrating examples of packets exchanged between the printing apparatus and the cloud print service.

In the acquisition request for the list information of the print jobs, for example, a packet 1301 in FIG. 15A is transmitted. In this example, since a user named Alice is logged in to the printing apparatus, the packet stores account information regarding the user. The cloud print service 103 having received the acquisition request for the list information of the print jobs specifies a virtual printer on the basis of an inquiry URL that has received the acquisition request for the list information. Next, the cloud print service 103 checks whether or not a print job for the user is stored in the specified virtual printer, and returns a result thereof. If there is a print job of the user, the cloud print service 103 returns a packet including information regarding the corresponding job ID, as a packet 1302 in FIG. 15B, and if there is no print job of the user, returns a packet without storing job information in the packet. In the example illustrated in FIG. 6, in S512, the cloud print service 103 returns the list information of the print jobs of the user Alice managed by the virtual printer 502 to the printing apparatus 101. In S514, the cloud print service 103 returns the list information of the print jobs of the user Alice managed by the virtual printer 501 to the printing apparatus 101. Here, as an example, it is assumed that the print jobs of Alice are put into the virtual printer 501 in S508. On the other hand, it is assumed that the print job of Alice is not put in the virtual printer 502. In this case, a response from the virtual printer 501 includes a print job ID, and a response from the virtual printer 502 does not include the print job ID.

In S515 in FIG. 6, the CPU 401 of the printing apparatus 101 merges the response results indicating the list information corresponding to each virtual printer acquired from the cloud print service 103, and displays a job list screen including the acquired print job information. The screen 903 in FIG. 11A is an example of the job list screen displayed in S515. In the present embodiment, a case where a list of print jobs retained in the virtual printer of the cloud print service 103 is displayed is described, but the present invention is not limited to this. There may be a configuration in which a retained print job directly put into the printing apparatus is merged and displayed on the job list screen. The job list screen functions as a job selection screen for allowing the user to select a print target job.

In S516, the CPU 401 of the printing apparatus 101 detects that the user has selected any print job to be executed (printed) from among the print jobs included in the list information of the print jobs. Next, in S517, the CPU 401 transmits a print job movement request to the cloud print service 103. The movement request is a request for moving a print job designated as a target from a virtual printer queue to a printer queue provided for the printing apparatus 101. The movement request includes information for specifying a printer queue that is a movement destination and an access token corresponding to a virtual printer that currently stores the print job. The print job movement request may be made by using a unique operation such as "Move-Job". In the print job movement request, for example, a packet 1303 in FIG. 15C is transmitted. The packet 1303 exemplifies a movement request packet if a printing request for two print jobs such as job numbers 1 and 2 illustrated in FIG. 9 is received.

In the packet 1303, a job ID for specifying a job to be moved and a printer UUID for specifying a printer that is a movement destination are designated. In this example, since it is desired to move the print job put in the virtual printer 501 to the printer queue for the printing apparatus 101, a UUID of the printing apparatus 101 is designated. In S518, the cloud print service 103 having received the print job movement request moves the print job designated in the movement request packet from the printer queue of the virtual printer 501 to the printer queue for the printing apparatus 101. A movement request packet in which a movement destination printer UUID and the first access token are associated with each other may be transmitted. In this case, the cloud print service 103 specifies a movement destination printer queue on the basis of the UUID. Next, it is verified by using the first access token whether or not access to the printer queue is to be permitted. As a result of verification, the cloud print service 103 performs a process of moving the job between the queues if it is determined that access is to be permitted. On the other hand, if it is determined that access is not to be permitted, an error is returned in response to the request.

In S519, the print object for the printing apparatus 101 that has detected the job movement to the printer queue for the printing apparatus 101 provided on the cloud print service 103 performs the following process. The print object provides a push notification of an event indicating that a print job has been put to the printing apparatus 101. For example, an operation defined in the IPP called "Get-Notification" is used for the push notification. At startup, the printing apparatus 101 transmits a notification request for a print job inputting event to the cloud print service 103, maintains connection until the event occurs, and waits. The push notification including a Job-Fetchable event indicating that the print job has been put is provided to the printing apparatus 101. In S520, the CPU 401 of the printing apparatus 101 having received the push notification makes a print job acquisition request for requesting acquisition of a print job of the corresponding user to the cloud print service 103. The CPU 401 causes the first access token to be included in the acquisition request. For example, an operation defined in the IPP called "Fetch-Job" is used for the print job acquisition request.

Figure 15D:
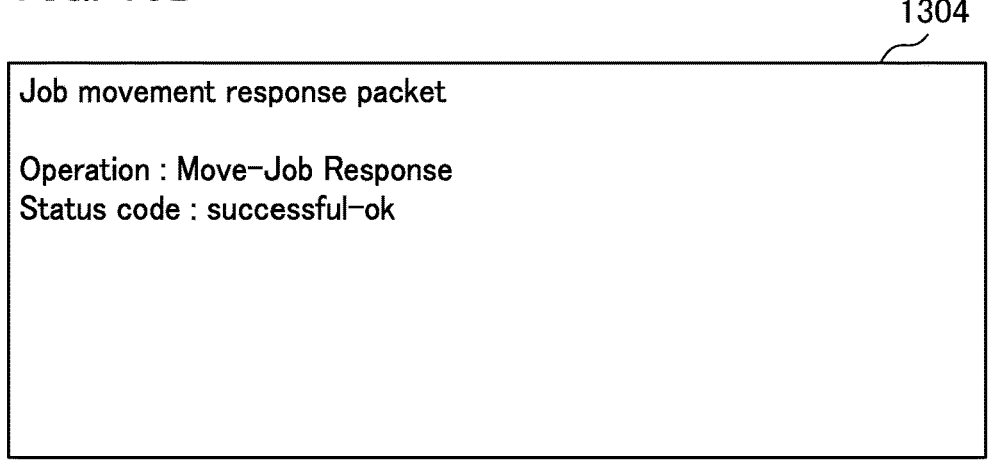
Figure 15E:
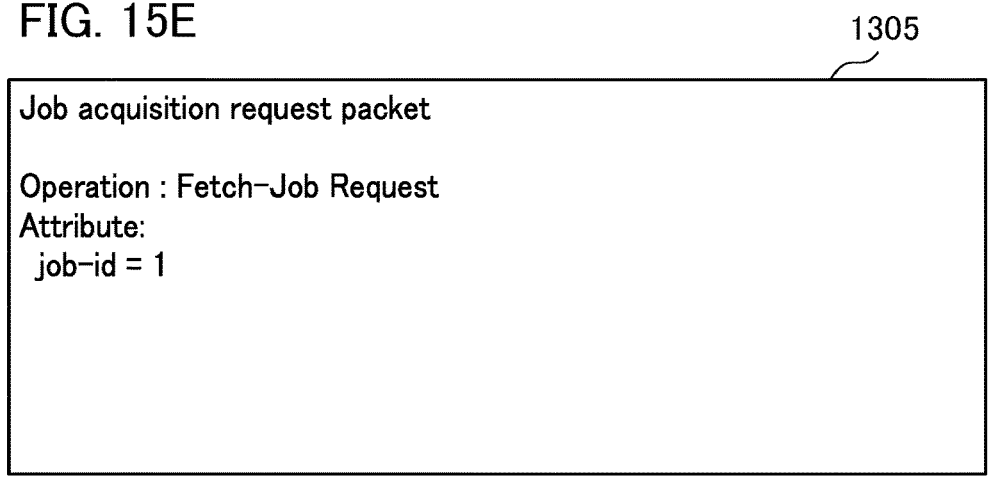
Figure 15F:
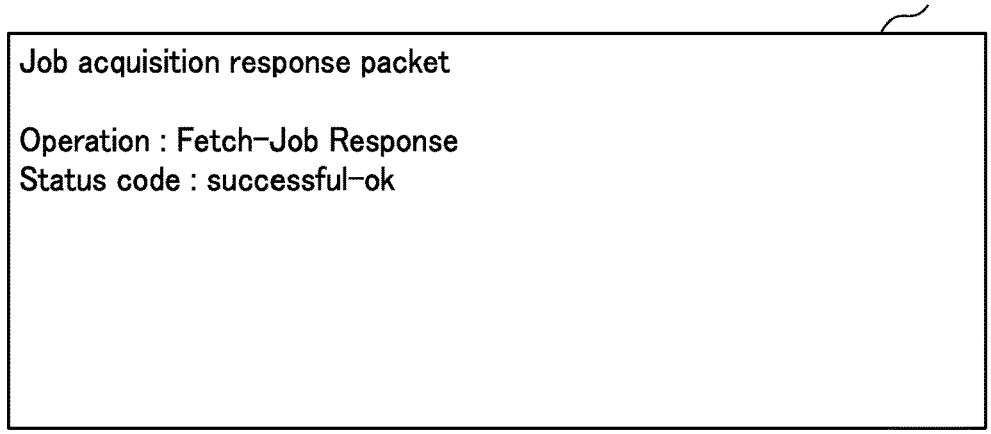

In the print job acquisition request, for example, a packet 1305 in FIG. 15E is transmitted. In the packet 1305, a job ID that is identification information of the print job that is an acquisition target is designated. The print job acquisition request is transferred to the printer object for the printing apparatus 101. The print object for the printing apparatus 101 transmits data regarding the corresponding print job to the printing apparatus 101 in response to the print job acquisition request. For example, a packet 1306 in FIG. 15F is used for transmitting the data regarding the print job.

In S521, the printing apparatus 101 receives the data regarding the corresponding print job transmitted by the cloud print service 103. In S522, the printing apparatus 101 performs a printing process. In the present embodiment, an example of applying Fetch-Job has been described, but any protocol or an operation capable of realizing acquisition of a print job, such as a Fetch-Document operation, may be used.

<Process Flow in Printing Apparatus>

Figure 12:
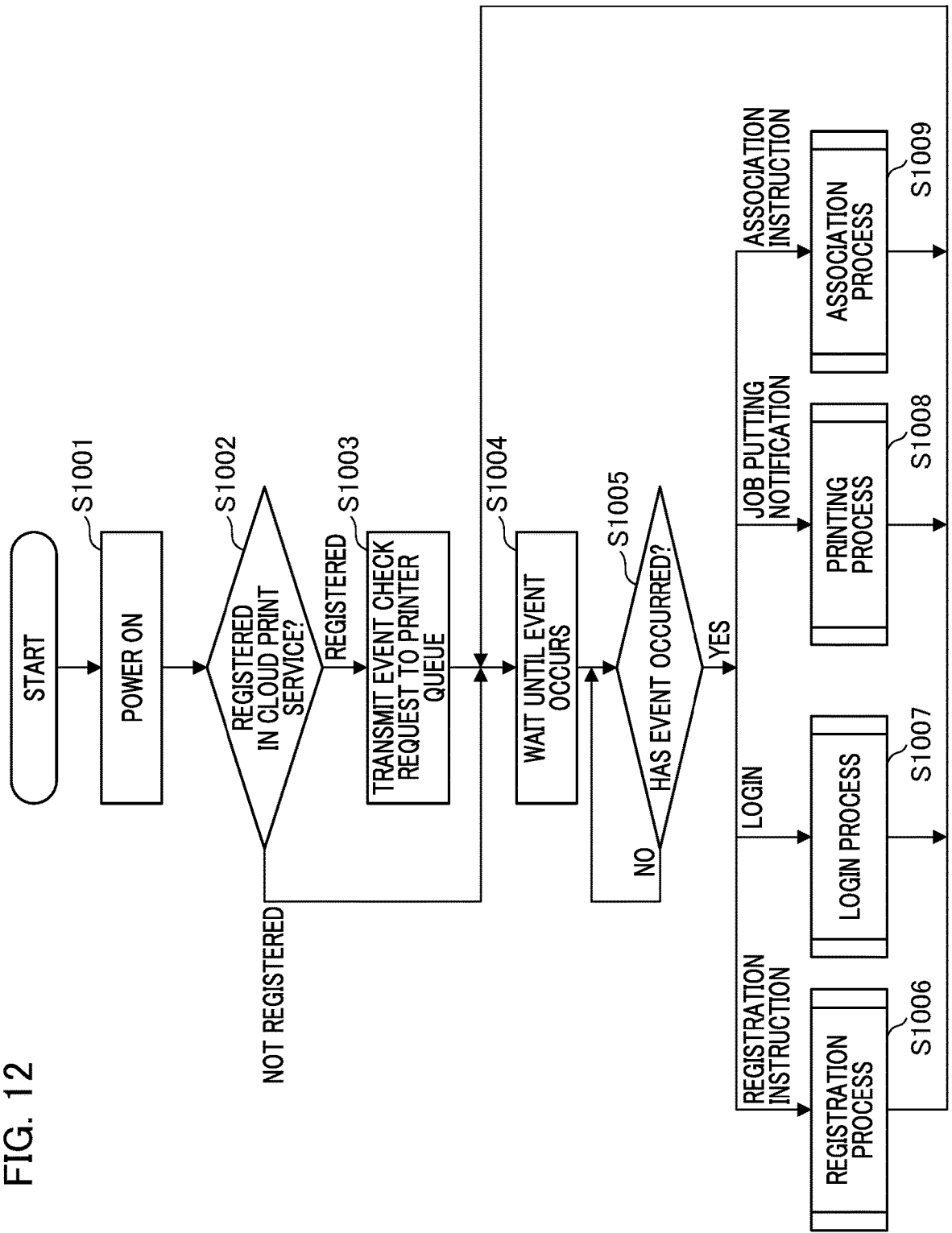
FIG. 12 is a flowchart illustrating an example in an operation process of the printing apparatus.

FIG. 12 is a flowchart illustrating an example of operation processing of the printing apparatus in the present embodiment. First, in S1001, the printing apparatus 101 is turned on. In S1002, the CPU 401 determines whether the own apparatus, that is, the printing apparatus 101 has been registered in the cloud print service 103. If the printing apparatus 101 has already been registered in the cloud print service 103, the process proceeds to S1003. If the printing apparatus 101 has not been registered in the cloud print service 103, the process proceeds to S1004. In S1004, the CPU 401 waits until a registration process event from the user occurs.

In S1003, the CPU 401 transmits an event check request to the cloud print service 103. For example, a Get-Notification request is used for the event check request. Next, in S1004, the CPU 401 waits while maintaining the connection with the cloud print service 103 until an event occurs.

Next, in S1005, the CPU 401 determines whether an event has occurred. If no event has occurred, the process returns to S1005. If an event has occurred, any of the processes in S1006 to S1009 is executed according to the event that has occurred. If a registration instruction event has occurred, the process proceeds to S1006.

In S1006, the CPU 401 registers the printing apparatus 101 in the cloud print service 103. If the registration of the printing apparatus 101 is successful, a printer queue of the printing apparatus 101 is generated in the cloud print service 103. The registration process for the printing apparatus 101 corresponds to the processes in S201 to S204 in FIG. 2. After the registration of the printing apparatus 101 is completed, the CPU 401 transmits an event check request to the cloud print service 103, and maintains the connection until an event occurs in the cloud print service 103, that is, until a push notification is provided, and waits.

If a login event has occurred, the process proceeds to S1007. In S1007, a login process is executed. When a print job inputting event has occurred, the process proceeds to S1008. In S1008, a printing process is executed. If an event of an instruction for association with the virtual printer occurs, the process proceeds to S1009. In S1009, a process of associating the virtual printer on the cloud print service 103 with the printing apparatus 101 is executed.

Figure 13:
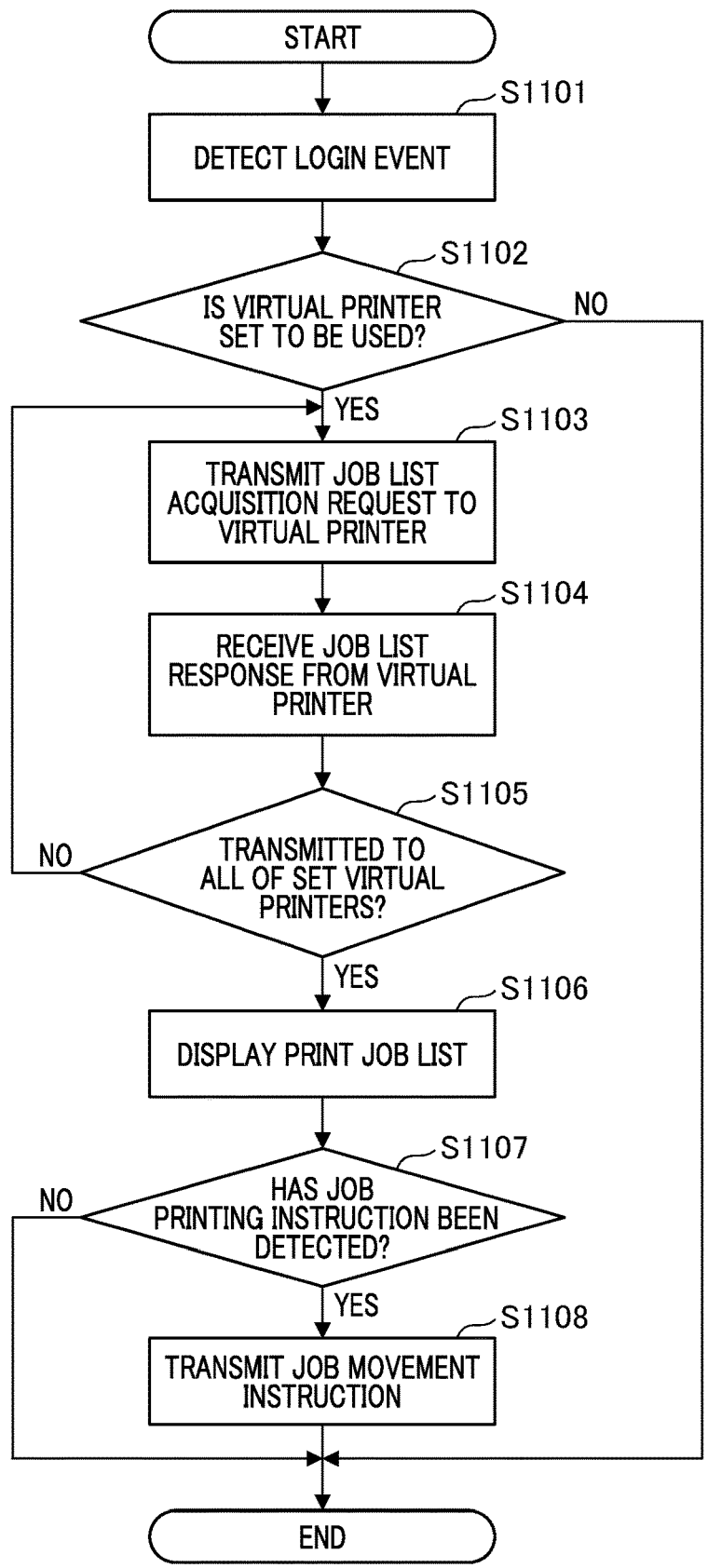
FIG. 13 is a flowchart illustrating an example of a login process.

FIG. 13 is a flowchart illustrating an example of the login process.

First, in S1101, the CPU 401 detects that a login event has occurred, that is, the user has logged in to the printing apparatus 101. Next, in S1102, the CPU 401 determines whether the printing apparatus 101 has been registered in the cloud print service 103 and a setting for using the virtual printer is enabled. If a setting item "use virtual printer" is enabled through an operation using a cloud print setting screen 1401 illustrated in FIG. 16A, displayed by the printing apparatus 101, the CPU 401 determines that the setting for using the virtual printer is enabled. If the setting for using the virtual printer is disabled, the process ends and the CPU 401 returns to the event waiting state again. If the setting for using the virtual printer is enabled, the process proceeds to S1103.

In S1103, the CPU 401 transmits an acquisition request for list information of print jobs corresponding to the logged-in user, the print jobs being managed by the virtual printer set in association with the printing apparatus 101 on the cloud print service 103. The process in S1103 corresponds to the processes in S511 and S513 in FIG. 6.

Next, in S1103, the CPU 401 receives a response including the list information of the print jobs corresponding to the logged-in user, managed by the virtual printer. Next, in S1105, the CPU 401 determines whether or not the acquisition request for list information of print jobs has been transmitted to all virtual printers set in association with the printing apparatus 101. If there is a virtual printer to which the acquisition request for list information of print jobs has not been transmitted, the process returns to S1103. If the acquisition request for list information of print jobs has been transmitted to all virtual printers set in association with the printing apparatus 101, the process proceeds to S1106.

In S1106, the CPU 401 displays the list information of the print jobs on the job list screen 903 in FIG. 11A, for example. Next, in S1107, the CPU 401 receives an operation of selecting any print job from print information included in the list information of the print jobs through the user's operation, and determines whether or not to detect a print instruction for the selected print job. The operation of selecting a print job refers to an operation of selecting one or more print jobs via the job list screen. The detection of a print instruction refers to that an operation of selecting a "print" key via the job list screen is detected. If no print job is selected, the process ends and returns to the event waiting state. If a print instruction is detected after one or more print jobs are selected, the process proceeds to S1108.

In S1108, the CPU 401 transmits a movement request for moving the selected print job to the printer queue for the printing apparatus 101. The process in S1108 corresponds to the process in S517 in FIG. 6. In response to this print job movement request, the selected print job is moved from the virtual printer queue to the printer queue of the printing apparatus 101. After the process in S1108, the CPU 401 returns to the event waiting state again.

Figure 14:
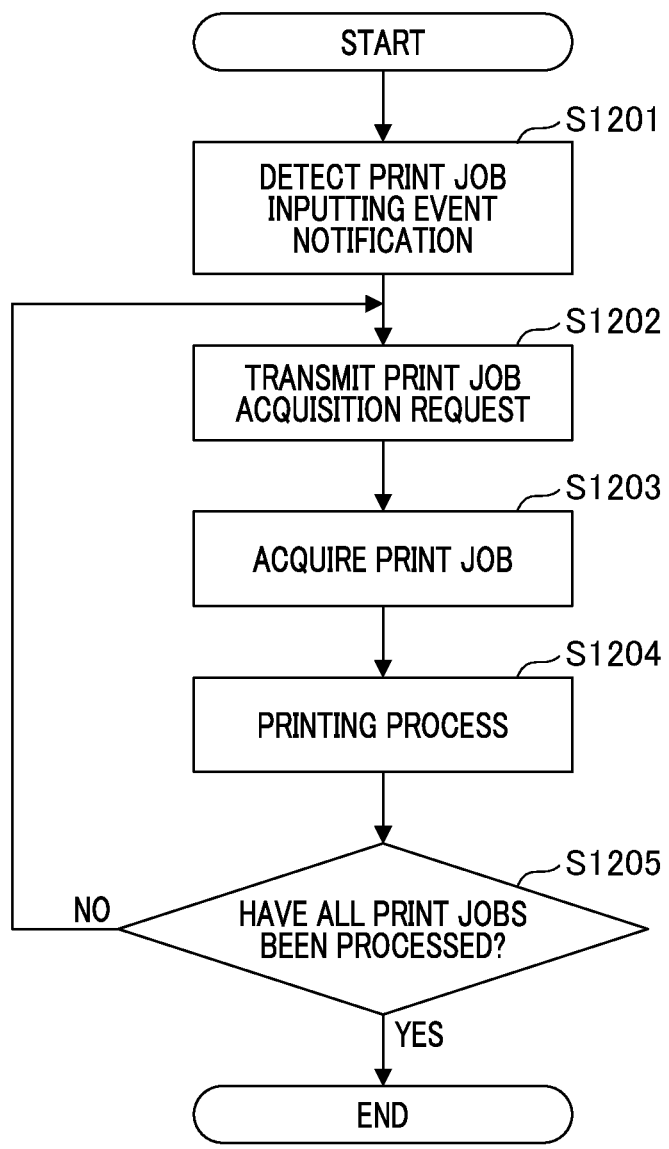
FIG. 14 is a diagram illustrating a printing process when a print job inputting event occurs.

FIG. 14 is a flowchart illustrating an example of a printing process if a print job inputting event has occurred.

Due to the process described with reference to FIG. 13, a print job is moved from the virtual printer to the printer queue of the printing apparatus 101 in the cloud print service 103. Consequently, as in S519 in FIG. 6, the cloud print service 103 provides a push notification of the print job inputting event to the printing apparatus 101. Consequently, in S1201, the CPU 401 detects the push notification of the print job inputting event.

Next, in S1202, the CPU 401 transmits a print job acquisition request to the printer queue of the printing apparatus 101 in the cloud print service 103. Next, in S1203, print job data is received from the printer queue in response to the print job acquisition request. In S1204, the CPU 401 executes a printing process on the basis of the received print job data.

Next, the CPU 401 determines whether processing has been completed for all print jobs received from the printer queue. If there is an unprocessed print job, the process returns to S1202. If the processing has been completed for all the print jobs received from the printer queue, the CPU 401 returns to the event waiting state again. According to the present embodiment, the printing apparatus 101 moves the print job from the virtual printer queue to the printer queue of the printing apparatus 101, makes the print job acquisition request to the printer queue, and thus does not communicate with the virtual printer for a long time. The printer object for a printing apparatus, which is another software module, can control transmission of print job data, control standby when a print error occurs in a real printer, and the like.

As described above, in the first embodiment, a printer object for a virtual printer functions as a front-end module from temporary storage of a print job to reception of an actual printing request. A printer object prepared for a real printer exchanges large-sized data communication with the real printer. That is, a software module prepared for the real printer, which has a one-to-one correspondence between a printer queue and an output destination can function as a back-end module for load balancing. Consequently, a load on the virtual printer can be reduced, and thus cloud printing capability and the performance thereof can be improved.

Second Embodiment

A printing apparatus of a second embodiment searches for a virtual printer registered in the cloud print service 103. The printing apparatus receives virtual printer candidates that can be associated with the printing apparatus from the cloud print service 103 through the above search. The printing apparatus transmits, to the cloud print service 103, a request for associating the printing apparatus as a subordinate printing apparatus of a virtual printer selected from among the received candidates through a user operation. The cloud print service 103 receives the request from the printing apparatus, performs a process of associating the printing apparatus as a subordinate printing apparatus of the virtual printer, and performs a process of issuing an inquiry URL and an access token for the printing apparatus to access the virtual printer. That is, in the second embodiment, in addition to presetting by an administrator described in the first embodiment, a structure for generating and associating a virtual printer from a printing apparatus registered in the cloud print service 103 is provided.

FIGS. 16A to 16C and FIG. 17 are diagrams illustrating examples of screens displayed by a printing apparatus and used for setting cloud printing. FIG. 18 is a diagram illustrating an example of a virtual printer setting process performed by a printing apparatus.

Figure 16A:
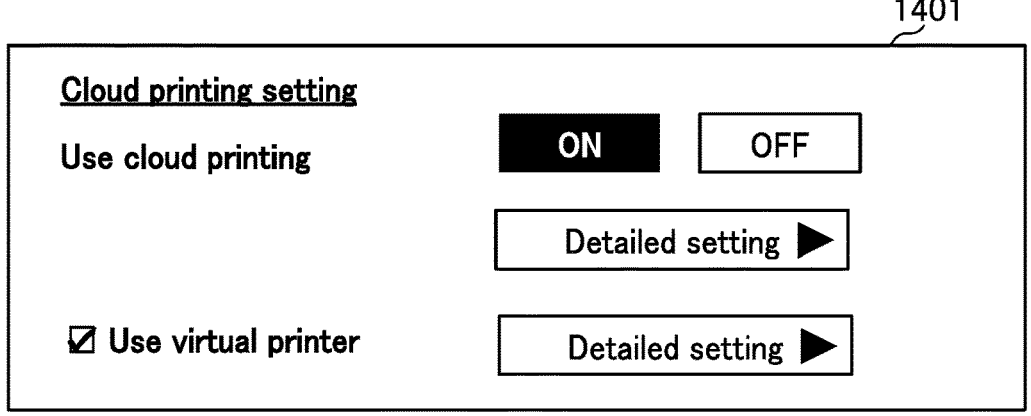
FIGS. 16A to 16C are diagrams illustrating examples of screens used for setting the cloud printing.
Figure 16B:
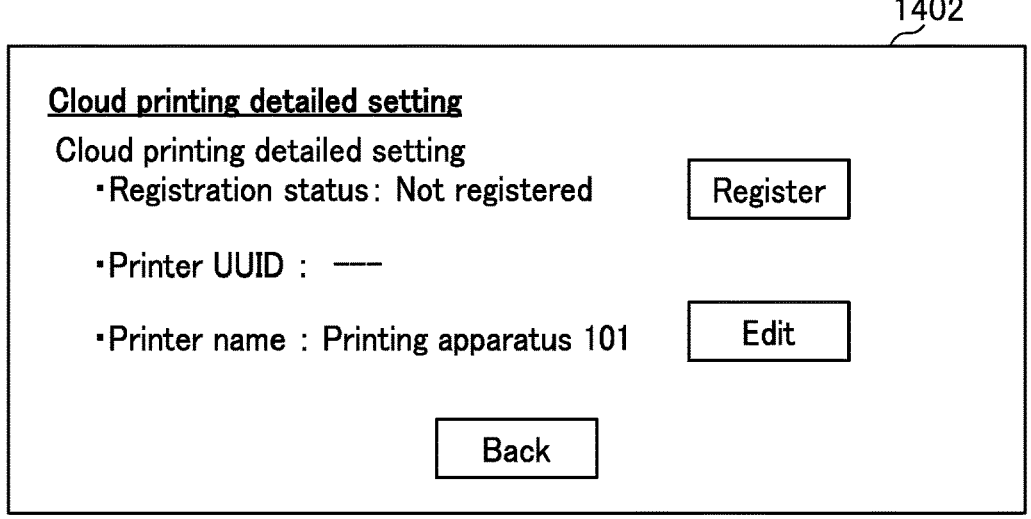
Figure 16C:
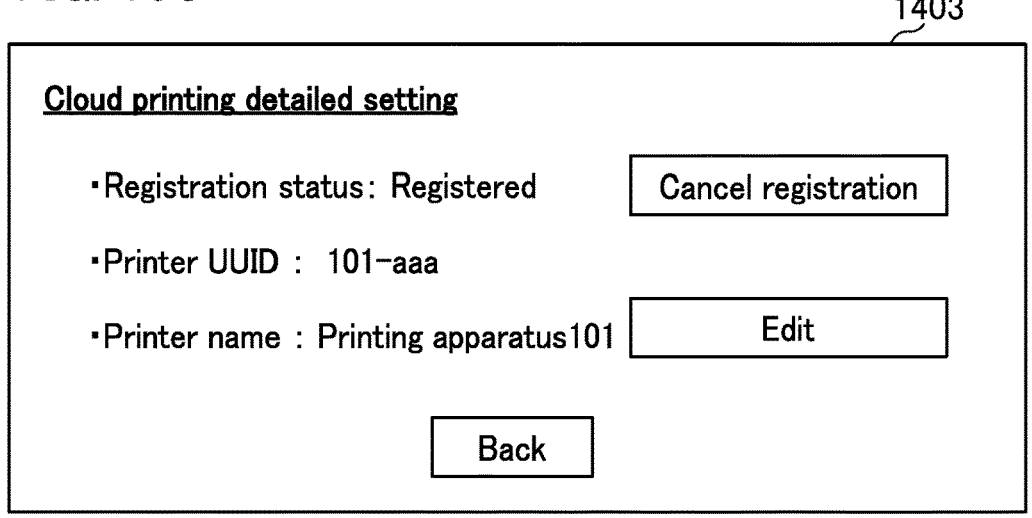

FIG. 16A illustrates a cloud print setting screen 1401 which is a cloud print setting top screen. The initial registration of the printing apparatus 101 to the cloud print service 103 is started through an operation of selecting a detailed setting button corresponding to the setting item "use cloud printing". The screen displayed by the printing apparatus 101 transitions to a cloud printing detailed setting screen 1402 illustrated in FIG. 16B by selecting the detailed setting button. When a registration button on the cloud print detailed setting screen 1402 is selected, a registration instruction event occurs. Thereafter, an authentication process is executed by entering cloud account information and the like as necessary, and registration of the printing apparatus 101 is completed. When the registration is completed, the printing apparatus 101 displays a cloud print detailed setting screen 1403. A registration status of the printing apparatus 101 is set to "registered" on the cloud print detailed setting screen 1403.

Next, a virtual printer setting process will be described. The user sets the setting item "use virtual printer" to be enabled and selects the detailed setting button on the cloud print setting screen 1401 illustrating in FIG. 16A. Consequently, the screen displayed by the printing apparatus 101 transitions to a virtual printer detailed setting screen 1404 illustrated in FIG. 17A. In this example, the virtual printer 501 has been added (registered) as a virtual printer associated with the printing apparatus 101.

When the user selects a search button on the virtual printer detailed setting screen 1404, the printing apparatus 101 is instructed to search for a virtual printer in S1501 in FIG. 18. The virtual printer search instruction corresponds to a virtual printer association instruction event. The screen displayed by the printing apparatus 101 transitions to a virtual printer search screen 1405 illustrated in FIG. 17B by selecting the search button. The virtual printer search screen 1405 functions as an account entry screen displayed in S1502 in FIG. 18.

The user enters cloud account information that is authentication information for accessing the cloud print service through an operation using the virtual printer search screen 1405 (S1503 in FIG. 18), and selects a search button. Consequently, a virtual printer registered in a cloud tenant corresponding to the entered cloud account information is searched for. Specifically, in S1504 in FIG. 18, an authentication request is transmitted from the printing apparatus 101 to the cloud print service 103. In S1505, an authentication response is transmitted from the cloud print service 103 to the printing apparatus 101. Next, in S1506, the printing apparatus 101 requests the cloud print service 103 to acquire list information of virtual printers registered in the cloud tenant. In S1507, the cloud print service 103 transmits the list information of the virtual printers to the printing apparatus 101. In S1508, the printing apparatus 101 displays a screen including the received list information of the virtual printers. For example, the printing apparatus 101 displays a virtual printer search result screen 1406 illustrated in FIG. 17C.

In S1509 in FIG. 18, the user selects a desired virtual printer from among the virtual printers displayed on the virtual printer search result screen 1406, and selects an add button. In this example, it is assumed that the virtual printer 502 is selected. In S1510, the printing apparatus 101 sets (adds) the selected virtual printer in association with the printing apparatus 101. When the virtual printer is added, the printing apparatus 101 makes a connection request to the virtual printer in order to check communication to be performed only once. The printing apparatus 101 acquires an access token (second access token) for subsequently accessing the virtual printer from the virtual printer that responds to the connection request.

Figure 17A:
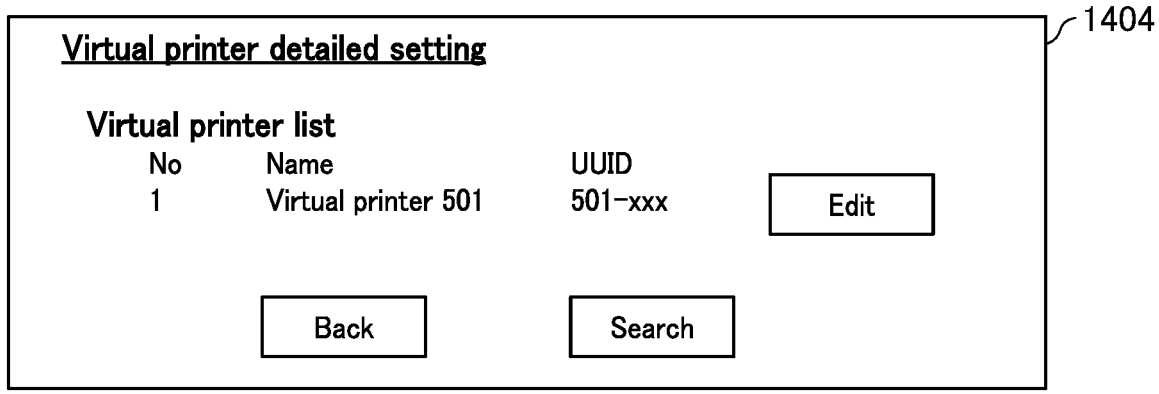
FIGS. 17A to 17D are diagrams illustrating examples of screens used for setting the cloud printing.
Figure 17B:
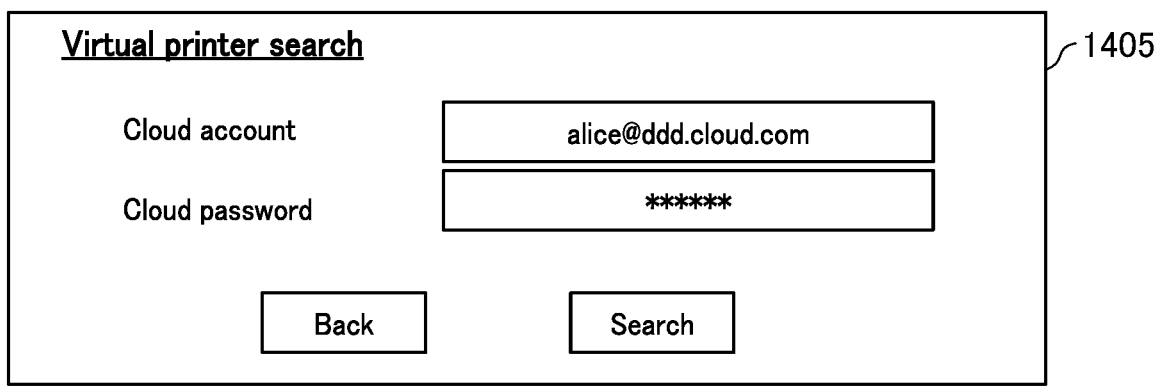
Figure 17C:
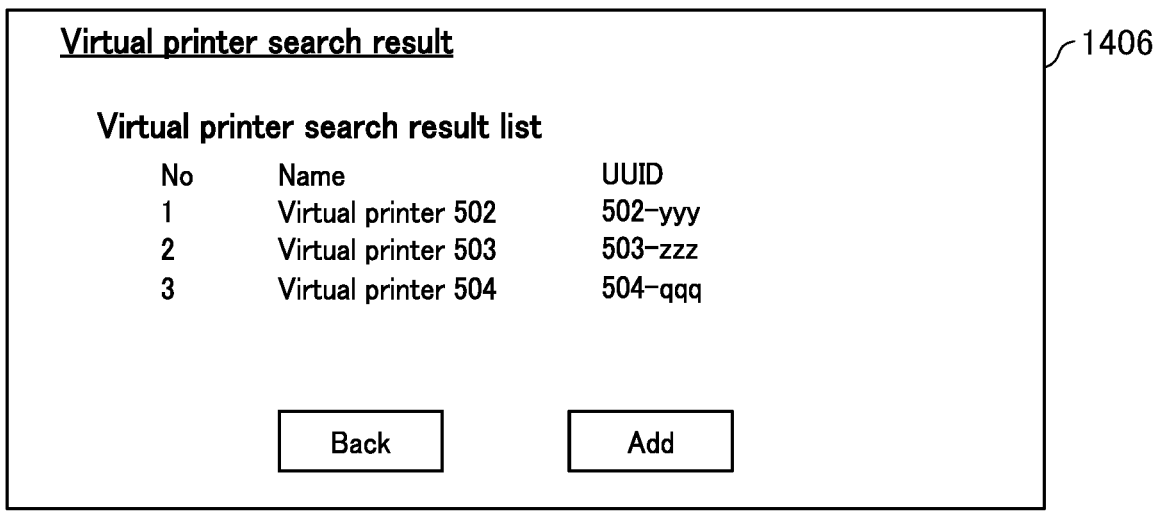
Figure 17D:
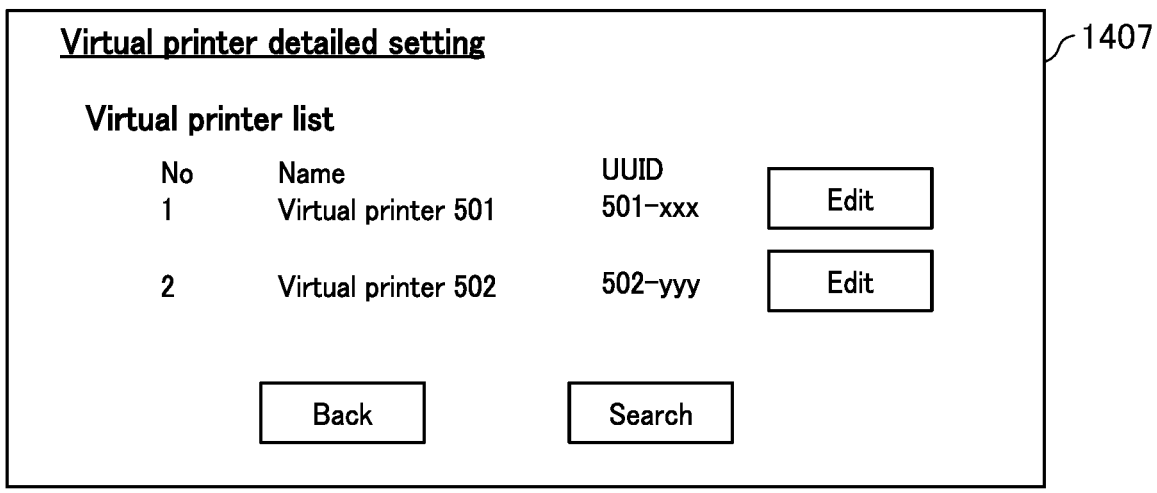

When the virtual printer is added, the printing apparatus 101 displays, for example, a virtual printer detailed setting screen 1407 illustrated in FIG. 17D. In addition to the virtual printer 501, the added virtual printer 502 is included as a virtual printer associated with the printing apparatus 101 in the virtual printer detailed setting screen 1407.

The printing apparatus 101 may display the virtual printer search screen 1405 used for entering the authentication information every time the virtual printer is searched, or the printing apparatus 101 holds the virtual printer in the cache and performs the second and subsequent searches. The display of the virtual printer search screen 1405 may be omitted in the second and subsequent searches.

Figure 19:
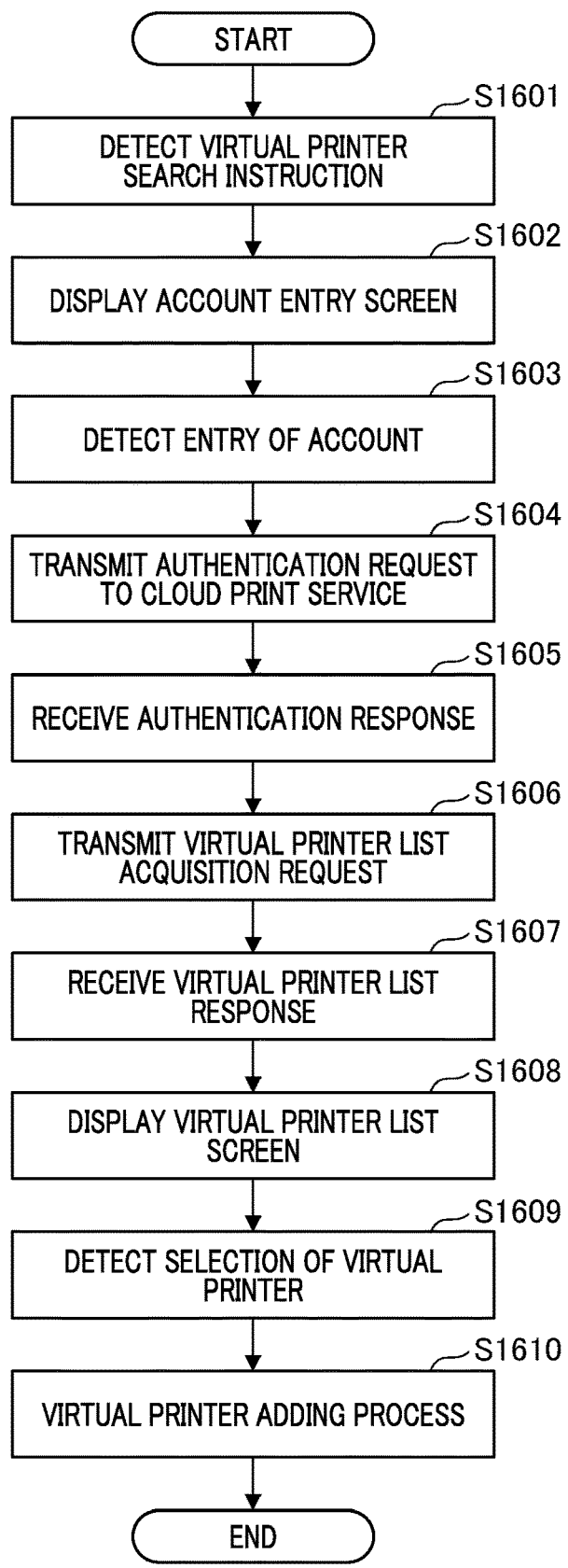
FIG. 19 is a flowchart illustrating an example of a process executed by the printing apparatus.

FIG. 19 is a flowchart illustrating an example of a process executed by the printing apparatus of the present embodiment.

First, in S1601, the CPU 401 detects that a search instruction for a virtual printer has been given. In S1602, the CPU 401 displays the account entry screen. Next, in S1603, the CPU 401 detects that the user has entered authentication information.

Next, in S1604, the CPU 401 transmits an authentication request including the entered authentication information to the cloud print service 103. Next, in S1605, the CPU 401 receives an authentication response from the cloud print service 103. Then, in S1606, the CPU 401 transmits an acquisition request for list information of the virtual printers to the cloud print service 103.

In S1607, the CPU 401 receives a response including the list information of the virtual printer from the cloud print service 103. Then, in S1608, the CPU 401 displays the list information of the received virtual printers. Next, in S1609, the CPU 401 detects that the user has selected a virtual printer. In S1610, the CPU 401 requests the cloud print service 103 to associate the printing apparatus 101 as a subordinate printing apparatus of the selected virtual printer. As a result, the selected virtual printer is associated with the printing apparatus 101.

Third Embodiment

In the present embodiment, it is possible to easily create a virtual printer, set association of a subordinate printer with the virtual printer, and change the virtual printer via a web screen provided by the cloud print service 103. The printing apparatus 101 receives a notification indicating that the printing apparatus 101 is associated with the virtual printer from the cloud print service 103, and sets the virtual printer as a printer associated with the printing apparatus 101.

<Cloud Print Service Screen>

FIGS. 20A to 22D are diagrams illustrating examples of setting screens of the cloud print service.

Figure 20A:
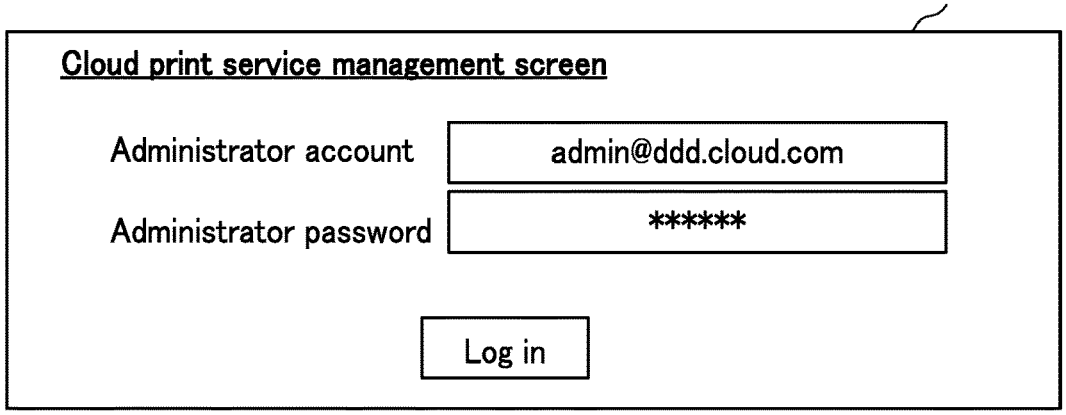
FIGS. 20A to 20C are diagrams illustrating examples of setting screens of the cloud print service.

A web server is operating in the cloud print service 103. In the present embodiment, it is assumed that an administrator accesses the web server from a browser of any terminal and operates a setting screen. The administrator enters cloud account information while the screen 1701 illustrated in FIG. 20A is displayed on the terminal, and logs in to the setting screen of the cloud print service 103. As a result, the administrator is logged in, and a setting top screen 1702 illustrated in FIG. 20B is displayed on the terminal.

Figure 20B:
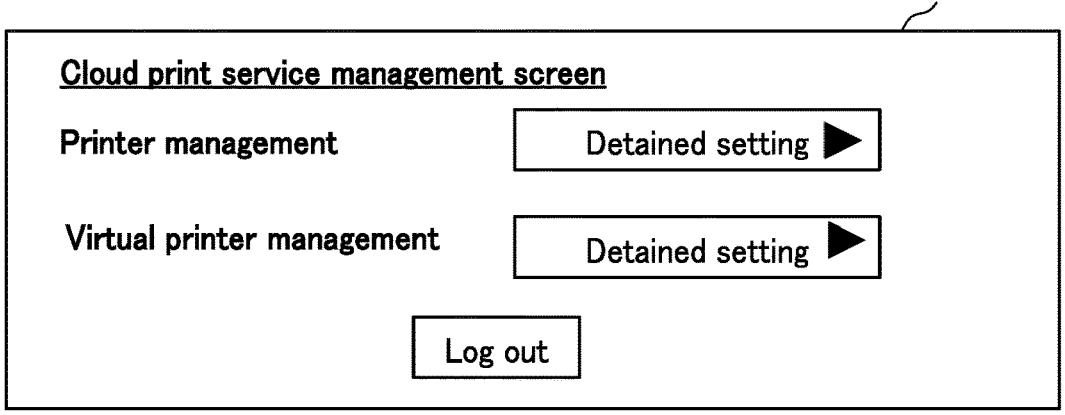
Figure 20C:
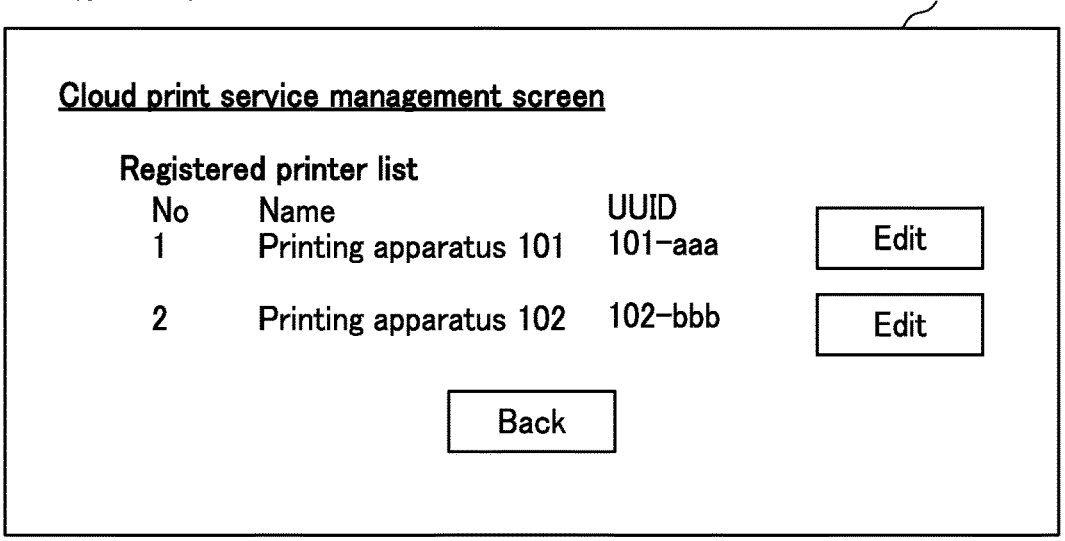

When a detailed setting button corresponding to a setting item "printer management" is selected through an operation on the setting top screen 1702, as illustrated in FIG. 20C, a setting screen 1703 including the list information of the printing apparatuses registered in the cloud print service 103 is displayed. The printing apparatuses included in the list information of the printing apparatuses are printing apparatuses in which the registration process (S201 to S204 in FIG. 2) to the cloud print service 103 has been successful. The administrator can delete the printing apparatuses or edit remarks information by selecting an edit button on the setting screen 1703.

The administrator selects a detailed setting button corresponding to a setting item "virtual printer management" on the setting top screen 1702 in FIG. 20B. Consequently, as illustrated in FIG. 21A, a setting screen 1704 including the list information of the virtual printers registered in the cloud print service 103 is displayed. In this example, it can be seen that the virtual printer 501 has already been registered. The administrator can register a new virtual printer in the cloud print service 103 by selecting a create button on the setting screen 1704. When the create button is selected, a new virtual printer creation screen 1705 in FIG. 21B is displayed.

A setting item "virtual printer name" is an item for setting a name of a virtual printer on the new virtual printer creation screen 1705. The administrator may set any virtual printer name for the setting item "virtual printer name". Assuming that the virtual printer 502 is created as a new virtual printer, the setting item "virtual printer name" is set to "virtual printer 502". A setting item "virtual printer UUID" is an item for setting a UUID of the virtual printer. The UUID is unique identification information (ID) for uniquely managing the virtual printer in the cloud print service 103. The cloud print service 103 may automatically generate a UUID in response to an operation of the administrator. The administrator may manually set a UUID if there is no duplication.

A setting item "virtual printer configuration" is an item for setting virtual printer configuration information and capability information. When the administrator selects the setting item "virtual printer configuration", a setting screen 1706 illustrated in FIG. 21C is displayed. The administrator sets basic configuration information and capability information of the printing apparatus through an operation on the setting screen 1706. Consequently, for example, it is possible to set whether the printing apparatus is a color machine or a black-and-white machine, and whether the printing apparatus corresponds to double-sided printing or single-sided printing. Ideally, configuration information that is set by using the setting screen 1706 is desirable to the same as configuration information of a printing apparatus group that is set in association with a virtual printer. When the administrator selects a complete button on the setting screen 1706 after setting the configuration information and capability information of the virtual printer, a virtual printer creation instruction is given to the cloud print service 103, and the cloud print service 103 creates a virtual printer.

Figure 22A:
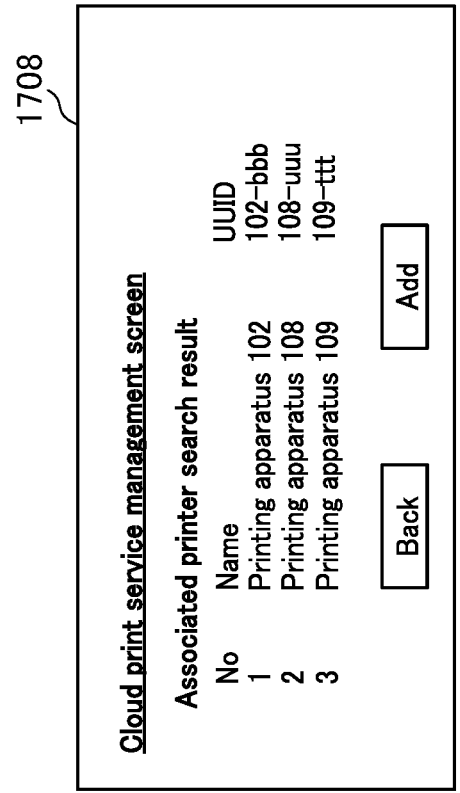
FIGS. 22A to 22D are diagrams illustrating examples of setting screens of the cloud print service.

On the new virtual printer creation screen 1705, a setting item "printer association" is an item for setting which printing apparatus is associated with the virtual printer. When the administrator selects the setting item "printer association", as illustrated in FIG. 22A, a screen 1707 including list information of printing apparatuses associated with a setting target virtual printer (the virtual printer 502 in this example) is displayed.

Figure 22B:
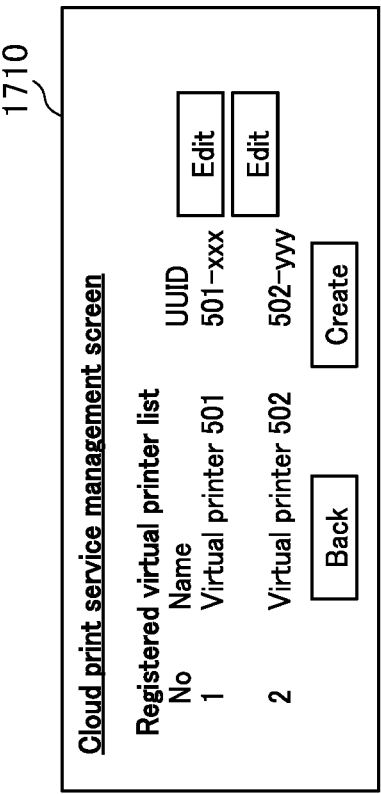

There is no associated printing apparatus at default, and thus the screen 1707 does not display a printing apparatus associated with the virtual printer. If the administrator wants to add a new associated printing apparatus, the administrator selects the search button. When the search is selected, the cloud print service 103 searches for a printer queue of a printing apparatus registered in the own tenant. As illustrated in FIG. 22B, the cloud print service 103 displays a screen 1708 including list information of registered printing apparatuses found through the search. The printing apparatuses displayed on the screen 1708 are printing apparatuses that have been successfully registered in the cloud print service 103 through the processes in S201 to S204 in FIG. 2.

Figure 22C:
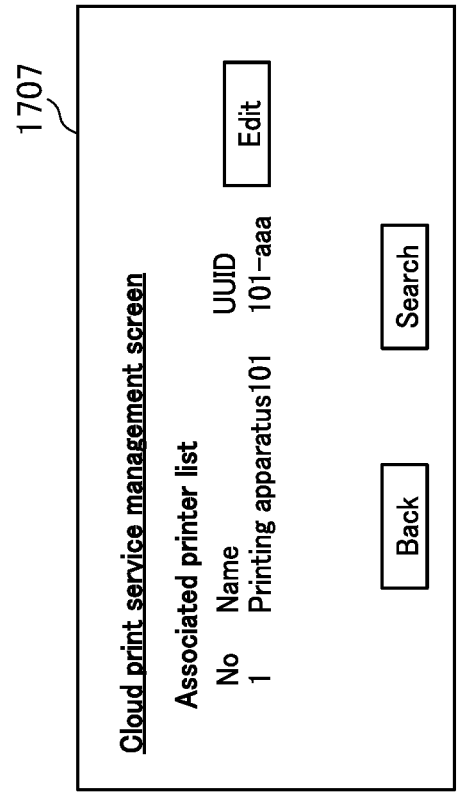
Figure 22D:
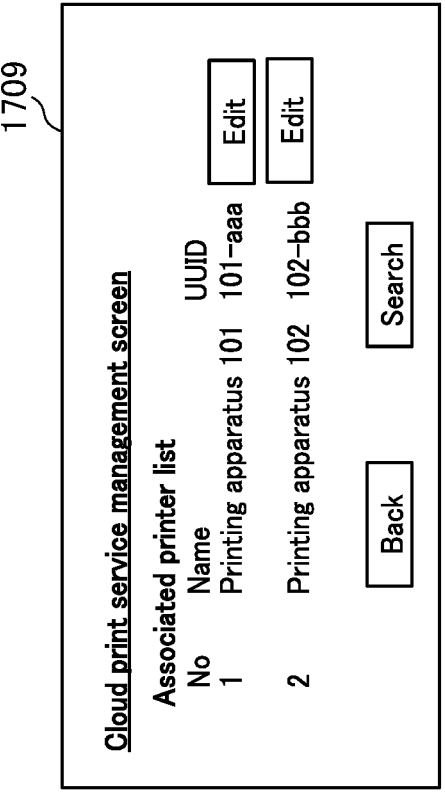

When the administrator selects any printing apparatus from among the printing apparatuses included in the list information of the printing apparatuses displayed on the screen 1708, the cloud print service 103 associates the selected printing apparatus with the virtual printer. A setting screen 1709 illustrated in FIG. 22C is displayed. The printing apparatus 101 and the printing apparatus 102 are associated with the virtual printer 502 on the setting screen 1709. When the administrator selects the back button, the displayed screen transitions to the setting screen 1706. When a creation complete button is selected through an operation on the setting screen 1706, the registration of the virtual printer is completed, and a setting screen 1710 illustrated in FIG. 22D is displayed.

Figure 23:
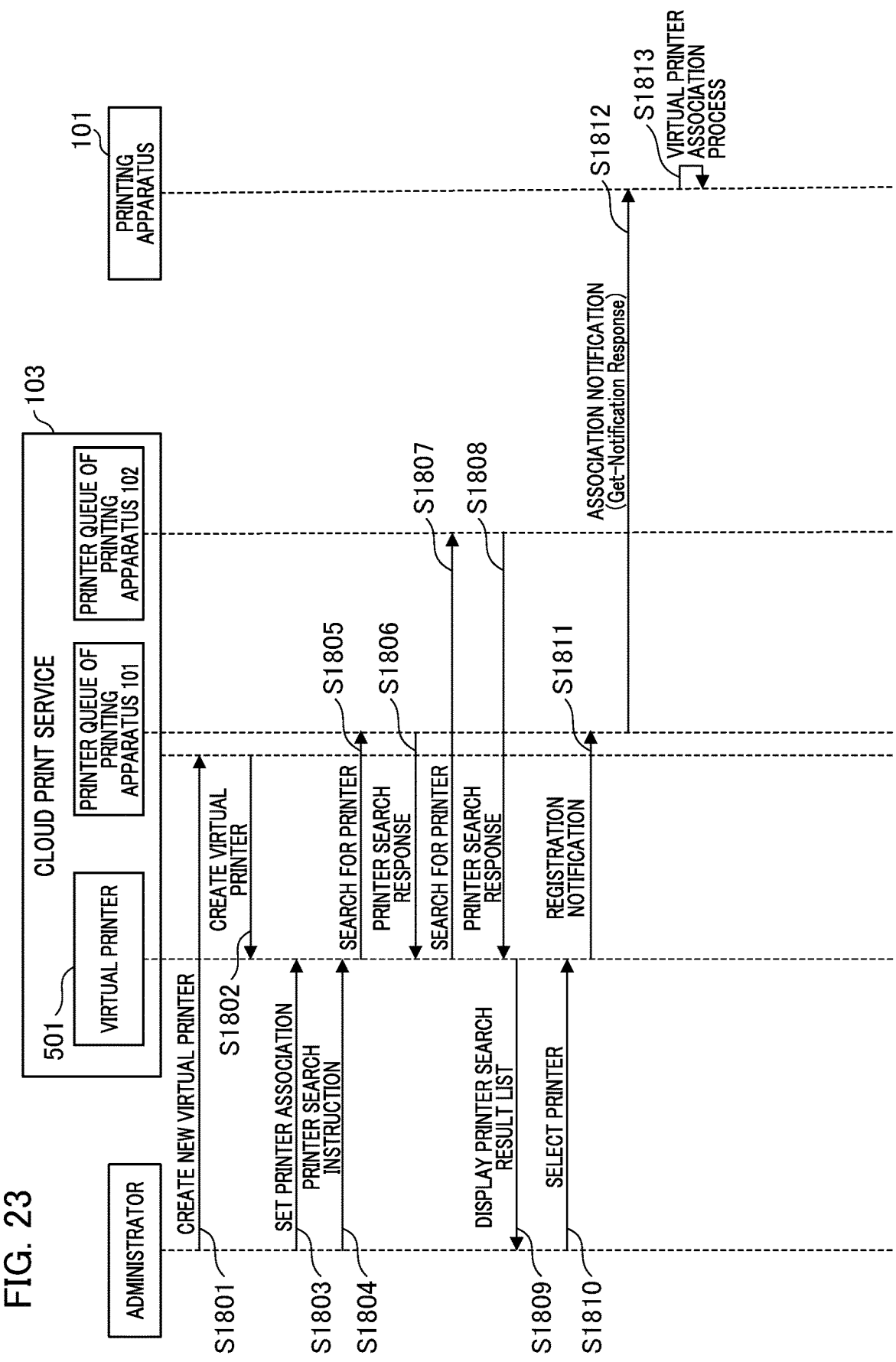
FIG. 23 is a diagram illustrating an example of a process of setting a virtual printer.

FIG. 23 is a diagram illustrating an example of a process of setting a virtual printer in the third embodiment.

The processes in S1801 to S1811 are the same as the processes described with reference to FIGS. 20A to 22D. In the description of FIG. 23, a process of creating the virtual printer 501 and associating the virtual printer 501 with the printing apparatus 101 will be described as an example. First, in S1801, the administrator enters information regarding the newly created virtual printer 501 into a setting screen displayed on the terminal, and instructs the cloud print service 103 to create the virtual printer 501. In S1802, the cloud print service 103 creates and manages the virtual printer 501 and a virtual printer queue in the tenant on the basis of the creation instruction for the virtual printer 501.

In S1804, the administrator selects the setting item "printer association" through an operation on the new virtual printer creation screen 1705 in FIG. 21B. Next, in S1804, the administrator instructs the cloud print service 103 to search for a printing apparatus associated with the virtual printer 501. In S1805 and S1807, the virtual printer 501 created in the cloud print service 103 makes a search request to printer queues of registered printing apparatuses in the same tenant in response to the above search instruction. In S1808 and S1807, the virtual printer 501 receives a search response from the printer queues of the printing apparatuses that have responded to the search request. In this example, it is assumed that the virtual printer 501 receives a search response from the printer queue of the printing apparatus 101 and the printer queue of the printing apparatus 102.

In S1809, the virtual printer 501 returns the search results of the printing apparatuses to the administrator's terminal. Consequently, the administrator's terminal displays list information of the printing apparatuses that are candidates to be associated with the virtual printer 501. Next, the administrator selects any printing apparatus from among the printing apparatuses included in the displayed list information of the printing apparatuses. In this example, it is assumed that the printing apparatus 101 is selected. In S1810, information regarding the selected printing apparatus 101 is transmitted to the virtual printer 501. In S1811, the virtual printer 501 transmits a registration notification to the printer queue of the selected printing apparatus 101. Consequently, the virtual printer 501 and the printing apparatus 101 are associated with each other.

It is necessary to notify the printing apparatus 101 that the virtual printer 501 is associated on the cloud print service 103. Therefore, in S1812, the cloud print service 103 provides an association notification to the printing apparatus 101. The association notification is a push notification for reporting that the printing apparatus 101 is associated with the virtual printer 501.

FIG. 24 is a diagram illustrating an example of a packet used for an association notification.

As shown in a packet 1901 illustrated in FIG. 24, for example, an operation called "Get-Notification Response" is used for the association notification. In the example of the packet 1901, "notify-subscribe-event" represents an event type. In this example, as the event type, information indicating that an event called virtual printer association has occurred is stored. Consequently, the printing apparatus 101 having received the packet 1901 detects that an association instruction event has occurred in S1005 in FIG. 12. The UUID information of the virtual printer associated with the printing apparatus 101 is stored in "device-uuid". The name of the virtual printer associated with the printing apparatus 101 is stored in "device-name". Token information (second access token) used when the printing apparatus 101 is connected to the associated virtual printer is stored in "access-token". If the virtual printer can be accessed by using the same token information as an access token for accessing the printer queue of the printing apparatus 101 on the cloud print service 103, storage of the token information in "access-token" may be omitted.

FIG. 23 will be referred to again. In S1813, the printing apparatus 101 having received the association notification sets the virtual printer corresponding to the association notification in association with the printing apparatus 101. The process in S1813 is the same as the process of adding the virtual printer described with reference to S1610 in FIG. 19.

Figure 25:
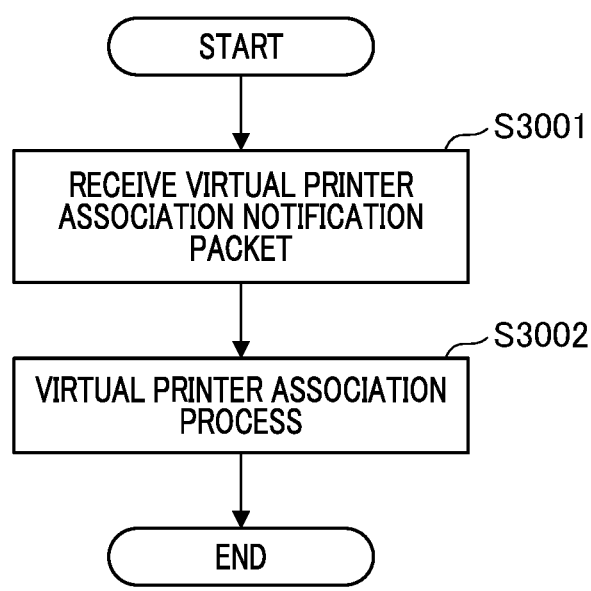
FIG. 25 is a diagram illustrating an operation process of the printing apparatus when the association notification is provided.

FIG. 25 is a flowchart illustrating an example of an operation process of the printing apparatus when an association notification is provided from the cloud print service.

In S3001, the CPU 401 of the printing apparatus 101 receives the association notification from the cloud print service. In S3002, the CPU 401 sets information regarding the virtual printer corresponding to the association notification in association with the printing apparatus 101. According to the present embodiment, even if the virtual printer and the printing apparatus are associated with each other on the cloud print service 103, a notification of association with the printing apparatus is provided, and thus the printing apparatus side can also appropriately set the virtual printer in response to the notification.

OTHER EMBODIMENTS

The present invention may also be implemented in a process in which a program that realizes one or more functions of the above-described embodiments is supplied to a system or an apparatus via a network or a storage medium, and one or more processors in a computer of the system or the apparatus read and execute the program. The present invention can also be implemented by a circuit (for example, an ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-192506, filed Nov. 19, 2020 which is hereby incorporated by reference wherein in its entirety.

What is claimed is:

1. A method of providing a cloud print service, the provision method comprising:
setting a correspondence relationship between a virtual printer and one or more registered printers on the basis of a user operation;
if a predetermined request for designating a print job stored in a queue of the virtual printer as a target is received from a first registered printer for which the correspondence relationship is set, moving the print job designated as the target to a queue of the first registered printer; and
if a request for acquiring the print job stored in the queue of the first registered printer is received from the first printer, transmitting the print job corresponding to the request to the first registered printer.

2. The method according to claim 1, further comprising:
generating the virtual printer on the basis of the user operation; and
managing registered printers that are registered in the cloud print service,
wherein the correspondence relationship between the virtual printer and one or more registered printers designated by the user among the managed registered printers is set on the basis of the user operation.

3. The method according to claim 1,
wherein the predetermined request received from the first registered printer is a movement request for moving the print job designated as the target from the queue of the virtual printer to the queue of the first registered printer.

4. The method according to claim 1, further comprising:
if the correspondence relationship between the virtual printer and the one or more registered printers is set, reporting that the virtual printer has been correlated with the one or more registered printers.

5. The method according to claim 1, further comprising:
if the correspondence relationship between the virtual printer and the one or more registered printers is set, providing a first access token used to access information managed by the virtual printer to the one or more registered printers.

6. The method according to claim 5,
wherein the request for acquiring the print job stored in the queue of the first registered printer includes a second access token used to access information managed by the first registered printer.

7. A non-transitory computer-readable storage medium storing a program for causing a computer to execute a method of providing a cloud print service, the method comprising:
setting a correspondence relationship between a virtual printer and one or more registered printers on the basis of a user operation;
if a predetermined request for designating a print job stored in a queue of the virtual printer as a target is received from a first registered printer for which the correspondence relationship is set, moving the print job designated as the target to a queue of the first registered printer; and
if the request for acquiring the print job stored in the queue of the first registered printer is received from the first printer, transmitting the print job corresponding to the request to the first registered printer.

8. An image processing apparatus comprising:
a memory storing instructions; and
a processor executing the instructions causing the image processing apparatus to:
register the image processing apparatus in a cloud print service and generate a queue storing a print job to be transmitted to the image processing apparatus on the cloud print service;
if the image processing apparatus is associated with a virtual printer on the cloud print service, acquire information of print jobs managed by the virtual printer from the cloud print service;
if an operation for printing the print jobs managed by the virtual printer is received, make a request for moving a print job that is specified on the basis of at least the acquired information of the print jobs to a queue for the image processing apparatus provided on the cloud print service; and
acquire the print job stored in the queue for the image processing apparatus on the cloud print service.

9. The image processing apparatus according to claim 8,
wherein, in the acquisition, information of a print job that corresponds to a user logged in to the image processing apparatus and is managed by the virtual printer is acquired from the cloud print service.

10. The image processing apparatus according to claim 8,
wherein the instructions further cause the image processing apparatus to:
display a job selection screen on the basis of the information of the print job acquired in the acquisition; and
specify one or more print jobs to be print targets on the basis of a user operation using the job selection screen, and
wherein, in the request, a request for moving the one or more specified print jobs to the queue for the image processing apparatus provided on the cloud print service is made.

11. The image processing apparatus according to claim 8,
wherein the instructions further cause the image processing apparatus to:
receive virtual printer candidates associated with the image processing apparatus from the cloud print service; and
request the cloud print service to associate the image processing apparatus as a subordinate image processing apparatus of a virtual printer selected from among the received candidates through a user operation.

12. The image processing apparatus according to claim 11,
wherein the instructions further cause the image processing apparatus to:
manage a first access token used to access the queue for the image processing apparatus provided on the cloud print service and a second access token used to access the virtual printer; and
issue the second access token to the image processing apparatus according to association based on the request in the request.

13. The image processing apparatus according to claim 8,
wherein the instructions further cause the image processing apparatus to set whether or not use of the virtual printer on the cloud print service is enabled.

* * * * *